United States Patent [19]
Sutton et al.

[11] 3,805,954
[45] Apr. 23, 1974

[54] APPARATUS AND METHOD FOR CONVEYING AND MANIPULATING SHEET-LIKE MEMBERS

[75] Inventors: Larry Leon Sutton; John Bratton, both of Abilene, Kans.

[73] Assignee: Combustion Engineering, Inc., Windsor, Conn.

[22] Filed: Dec. 18, 1972

[21] Appl. No.: 315,770

[52] U.S. Cl................... 209/125, 198/91, 198/94, 198/99, 214/1 SW, 214/6 F
[51] Int. Cl............................................. B07c 7/00
[58] Field of Search .......... 209/125, 73, 74; 198/35, 198/91, 94, 99; 271/64, 76; 214/1 S, 1 SW, 1 BD, 6 FA, 6 F, 11

[56] References Cited
UNITED STATES PATENTS
| | | | |
|---|---|---|---|
| 3,233,720 | 2/1966 | Atanasoff et al. | 198/38 |
| 3,324,989 | 6/1967 | Merkley et al. | 214/6 F |
| 2,497,149 | 2/1950 | Berdis et al. | 214/1 S |

FOREIGN PATENTS OR APPLICATIONS
| | | | |
|---|---|---|---|
| 820,731 | 9/1959 | Great Britain | 198/94 |

Primary Examiner—Allen N. Knowles
Attorney, Agent, or Firm—Stephen A. Schneeberger

[57] ABSTRACT

Apparatus for and the method of transporting members, such as wallboard, between a main transport path and an accumulation region spaced therefrom are described. Faulty members may be diverted from the main path to the accumulation region for repair and returned therefrom to the main transport path. The apparatus quickly, smoothly and supportingly conveys the members between the main path and a transfer region therebelow and between the transfer region and the accumulation region. Control means are provided to control operation of the apparatus in reject and/or reclaim modes of operation and additionally provide a novel method for stacking two or more members moving along the main path by controlling the operation of a downwardly pivoting conveyor along part of the main transport path.

28 Claims, 14 Drawing Figures

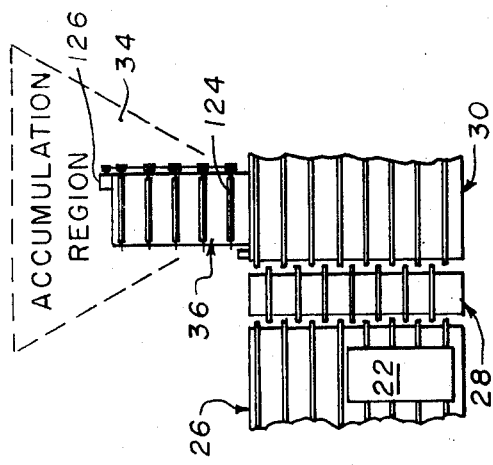
FIG. 1b
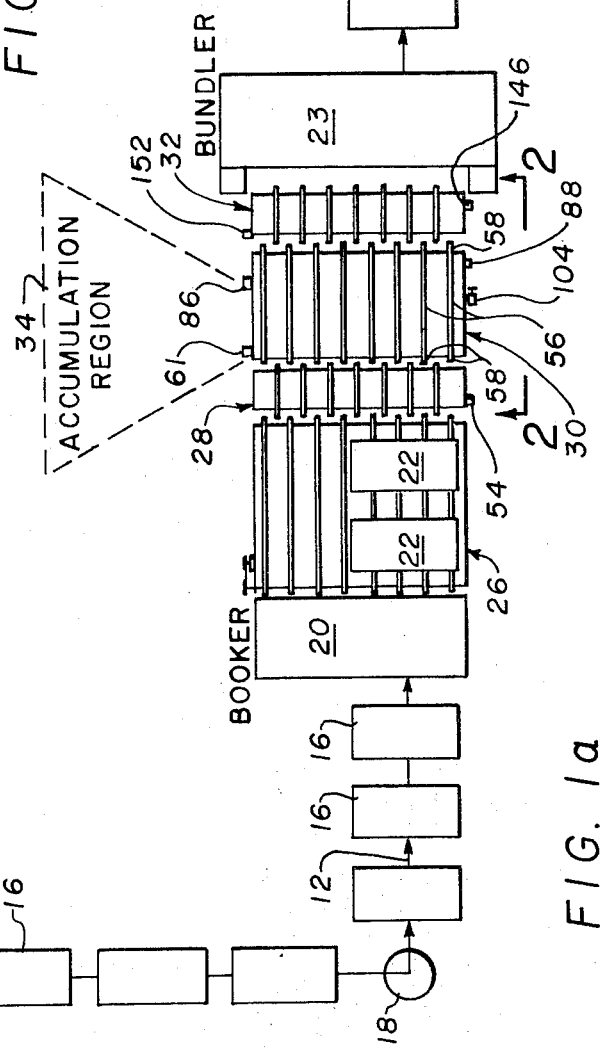
FIG. 1a
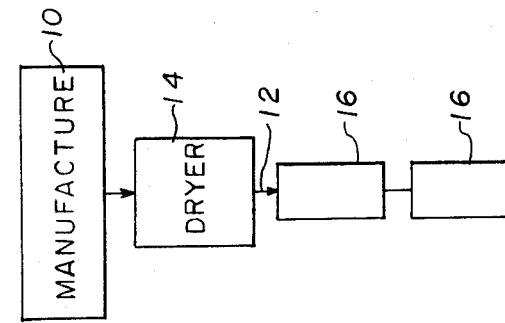

APPARATUS AND METHOD FOR CONVEYING AND MANIPULATING SHEET-LIKE MEMBERS

BACKGROUND OF THE INVENTION

The invention relates generally to conveyors of sheet-like materials and more particularly to the means and method within a conveyor system for transporting sheet or board-like members between a main transport path and an accumulation region. More particularly still, the invention relates to the means and method for rejecting said members from a main transport path to an accumulation region and for reclaiming said members from said accumulation region and reintroducing them into said main transport path. The invention further includes the means for and method of stacking such members.

The manufacturing process for a great number of products utilizes supportive conveyors for transporting materials in various stages of manufacture from one station to another. In many instances, the material conveyed is of a rigid or semi-rigid nature permitting the use of belt or roll-type conveyors or the like for its transport. Often times it is necessary during the manufacturing and/or packaging of a product to divert from a main transport path defined by the conveyors to some station offset therefrom. An example of this occurs in the manufacturing of gypsum wallboard wherein it is desirable to monitor the quality of the product at a late stage in the manufacturing process and to divert it from the main transport path to an accumulation or repair region if it is defective. This function may, of course, also be required with a variety of other products, as for instance sheets of wood veneer.

In the manufacture of gypsum wallboard, a continuous strip of damp wallboard is advanced along the main transport path. This strip is of predetermined width and is subsequently cut into sheets of a predetermined length longer than said width. The sheets advance along the main transport path through a drier which removes the excess moisture from them. Subsequently, the sheets are arranged in pairs of one on top of the other. These pairs are referred to as cards or books and the "booking" operation is typically accomplished by a device known in the art as a "booker" which takes one of an adjacent pair of sheets and places it inverted on the other. A book of wallboard sheets is then advanced along the main transport path to a bundler where the pair of boards are taped to one another as a unit for ease of handling. Each taped book is conveyed from the bundler to a storage or dispersal point for ultimate distribution.

At a point between the drier and the bundler, usually between the booker and the bundler, the wallboards are examined for defects arising from the manufacturing or transporting operations. If such defects are found, the board or boards are diverted from the main transport path to some station or region where they are accumulated and subsequently repaired or disposed of.

While it might appear most prudent to remove only each defective board from the main transport path, the bookers available in the art generally rely on a predetermined spacing between successive wallboards in order to properly effect the "booking" operation. Therefore, defective boards are generally not removed upstream of the booker. Rather, this function occurs downstream of the booker but prior to the binding of a book at the bundler. A defective book may be repaired, as by combining two good wallboard members from two rejected books to form a new book. This new book is then generally reintroduced into the main transport path at or near the point from which it was diverted.

Several techniques have evolved for diverting members from and returning said members to the main transport path. Means have been provided for laterally diverting and reclaiming defective books at substantially the same level as the main transport path. Such means are normally satisfactory if the board members are traveling along the main transport path with their longest dimension paralleling the direction of travel. However, in various manufacturing conveyor lines, and particularly that employed with the manufacture of gypsum wallboards, the individual board members are oriented prior to their entries into the booker such that they advance with their shorter dimension paralleling the direction of travel. This orientation is necessary to facilitate the booking and bundling operations in the most expedient and economical manner. Board members with this orientation might be rejected and/or reclaimed with a similar lateral motion; however, it will be evident that at any particular rejection or reclamation speed it will take longer to completely reject a member from or reintroduce a member to the main transport path than if the member were oriented with its long side paralleling the main transport path. If the spacing between subsequent members or books is sufficiently great, this additional time requirement may be tolerated; however this is usually not the case. Increased speeds of manufacture and transfer, coupled with the operational characteristics of the booker, space successive books so closely that there is insufficient time for complete rejection or reclamation of a particular book from the main transport path before the next upstream book in the main transport path appears thereat. Attempts to avoid this problem by accelerating the lateral rejection or reclamation movements have caused skewing of one board member of a book relative to the other and occasionally totally separated the two board members from one another.

One type of rejecting mechanism removes a defective book from the main path by elevating a portion of the main conveyor in "trap-door" fashion and allowing the book to drop to a support surface therebelow. This technique often results in damage to one or both board members and possible skewing thereof.

One type of reclaim mechanism employs a magazine capable of holding one or several "repaired" board members or books positioned above the main transport path. The magazine may be loaded manually or automatically and it drops each board member or book onto the main transport path conveyor at the proper time. This device, however, often damages and/or skews a board member or book due to the feeding mechanism within the magazine and the subsequent fall from the magazine to the conveyor. Also, the possibility of jamming and interfering with the main transport conveyor is significant.

Accordingly, it is desirable that means be provided for rapidly removing board members, or books thereof, from a main transport path and for their rapid reintroduction thereto, particularly when their long side extends transversely of the main transport path thereat, in a manner which preserves their structural integrity and alignment.

Additionally, it may be desirable to provide means for booking two or more adjacent sheets in a manner such that none is inverted and all have the same side facing upward. This requirement would arise where the sheets or wallboard have a particular side or surface to which a covering or coating, such as vinyl, will later be applied. Typically, wallboard is manufactured with a rough and a smooth surface and the vinyl is applied to the latter.

SUMMARY OF THE INVENTION

According to the invention there is provided a novel method and means for conveying sheet or board-like members, or books thereof, between the main transport path and an accumulation region, or station, offset from said main transport path.

A conveyor table in the main transport path is downwardly pivotable therefrom about its upstream end to supportingly convey a member or book to be rejected downwardly to a transfer region spaced below the main transport path. Conveyor means in said transfer region receive said member or book and convey it to an accumulation region laterally offset from the main path.

The conveyor means providing transport communication between said transfer region and accumulation region is reversible for either delivering defective books or members to the accumulation region or returning repaired books or members to the transfer region. A second conveyor table in the main transport path is downwardly pivotable therefrom about its downstream end and is positioned to receive a repaired book or member from the transfer region and supportingly convey it to the main transport path for reintroduction thereto.

The conveyor means in said transfer region and extending therefrom include one conveyor for transporting members in essentially the same direction as the main transport path and another at least partially coextensive with the one for transporting members laterally of the one between the transfer region and the accumulation region. This latter conveyor, at its region of coextensivity with the former, is vertically movable relative thereto and may comprise thereat two conveyor subtables each vertically movable relative to the other.

Control means operative in a normal mode, a reject mode or a reclaim mode are associated with the various conveyors for controlling the downward pivoting of the pivotable conveyors, for controlling the elevations of the two said conveyor subtables relative to that of the conveyor with which they are coextensive to effect transfer of a book or board member therebetween, and for controlling the direction in which board members are propelled between the transfer region and the accumulation region. The control means provide automatic operation of the several mentioned conveyors to reject and reclaim various board members or books thereof.

Further, means are provided for "booking" two or more adjacent sheets in a manner which avoids inverting any of the sheets. The novel booking means assemble a book or card such that the same particular surface of each sheet therein is facing upwardly. In this relationship, subsequent addition of a cover material to the particular surface may be easily accomplished. This avoids the need to re-invert a sheet which would have been previously inverted by prior art booking means.

The novel booking means include a power driven conveyor normally in the main transport path and downwardly pivotable slightly therefrom about its downstream end to place its upstream end below the plane of the main path. The control means therefore are operative in a stacking or booking mode for automatically stopping the conveyor when a first sheet is on it, pivoting it downward slightly to slidingly receive another subsequent sheet on top of the first to form a book, pivoting the conveyor back to the main transport path and resuming drive of the conveyor to propel the book downstream. The pivotable conveyor of the booking means may be one of the pivotable conveyors of the reject-reclaim system mentioned above and the control means may be integrated therewith.

BRIEF DESCRIPTION OF THE DRAWINGS

FIG. 1a is a somewhat diagrammatical plan view of a gypsum wallboard manufacturing system and conveyor means therefor incorporating the reject and reclaim conveyor mechanism of the invention.

FIG. 1b is essentially the same as FIG. 1a, however, showing the accumulation region as spaced laterally of the main conveyor line and including a conveyor extension thereto.

DESCRIPTION OF THE PREFERRED EMBODIMENT

Figure 2:
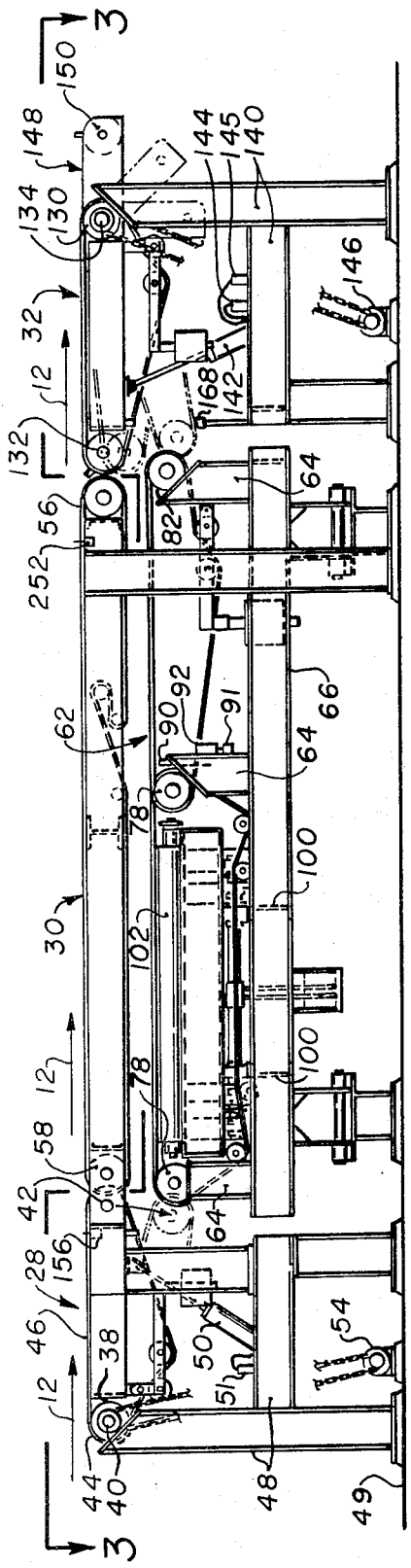
FIG. 2 is a side elevation view of FIG. 1a or 1b taken along line 2—2 showing the several conveyors comprising the reject and reclaim assembly.

The embodiment disclosed hereinafter describes the novel conveying method and apparatus of the invention in use in the manufacture and transport of gypsum wallboard. It will be evident, however, that the invention might be applied to the transport of a variety of board or sheet-like materials, as for instance veneers. The invention is particularly, though not exclusively, adapted for use in a material conveying system in which the board or sheet-like members are to be rejected from and/or returned to a main transport path at a location therealong in which they are oriented with their longest dimension extending tranversely of the direction of said main path. It should also be noted that, while the system hereinafter described refers to a method and means for combinedly rejecting and reclaiming members, a portion only of such means might be used to perform only the reject operation or only the reclaim operation.

Referring now to the drawing, FIG. 1a depicts a somewhat diagrammatic plan view of a gypsum wallboard manufacturing system including transport of the product from station to station. The basic manufacturing steps occur at the box numbered 10. These steps would include the preparation of gypsum wallboard in a damp continuous strip having a predetermined width of 16, 24 or 48 inches and a thickness of 3/8 inch to 3/4 inch. Typically, the strip has a "smooth" side and a "rough" side. The strip is conveyed along main transport path 12 to a drier 14 wherein the excess moisture is removed therefrom.

The main transport path 12, as hereinafter used, refers to the path followed by the wallboard during the normal manufacturing and packaging steps. Main path 12 is defined and determined by a series of conveyors, only some of which are shown, generally power driven, which transport the wallboards from station to station.

Following the drying operation, the wallboard strip is cut, by means not shown, into sheet or board-like members 16. Each wallboard member is cut to a predetermined length, for instance, between 6 and 16 feet.

During a particular sequence, only boards of the same length exist for processing, as, for instance, 8 feet or 16 feet. The wallboard members 16 proceed serially along main path 12 to a direction changing table 18 whereat either the main path changes direction relative to the orientation of the members, or vice versa. Either way, wallboards 16 are then oriented with their length or longest dimension extending transversely of the direction of travel of main path 12 at 90° thereto and each having a short side at the same lateral reference position to accommodate the "booking" or "carding" operation occurring next at booker 20.

At booker 20 one of a pair of sequentially adjacent boards is placed on top of the other, in a known manner, to form a "book" 22. The typical booking operation rotates or "flips" one board on top of the other, inverting the upper book. Each book 22 comprises a pair of wallboard members 16, one substantially aligned on top of the other. Normally the smooth surface of the wallboard is initially up and inversion of the upper board as it forms a book 22 places two smooth sides in protected contact.

The books 22 leave booker 20 on a motor driven conveyor 26 and are generally spaced from one another by a distance less than or not significantly greater than the length of a wallboard 16. This occurs in an effort to provide a high speed manufacturing process, though the acceleration of conveyor 26 must not be so great as to skew books 22. Immediately upstream of booker 20 wallboard members 16 are generally spaced closer to one another than are books 22 downstream thereof and/or the conveyor thereat is traveling at a greater speed than is that following the booking operation.

A pivoting reject conveyor 28, a fixed conveyor 30 and a pivoting reclaim conveyor 32 respectively extend serially between conveyor 26 and a bundler 23 to define the main transport path 12 therebetween. Each book 22 then normally continues along main path 12 to bundler 23 of known design which applies tape or similar binding means along the width of the book to join the two wallboard members for ease of handling. The taped or "bundled" books 24 are then conveyed to storage, not shown, for later distribution. In most of the accompanying figures, books 22 have been omitted from conveyors 28, 30 and 32 for pictorial clarity.

If a wallboard member 16, or book 22, is noted as being defective, either before or after booker 20, or if a jam occurs at or downstream of bundler 23, it is desirable and usually necessary to divert various board members or books to an accumulation region or station 34. Accumulation region 34 is offset from and generally, but not necessarily, below the level of main transport path 12. The accumulation region may extend laterally of the main path 12 from a point immediately therebelow as seen in FIG. 1a, or from a spaced location as seen in FIG. 1b. In the latter instance, a conveyor such as pivoting tipple 36, communicates with the accumulation region 34 in a manner to be explained below.

Each book 22, regardless of length, has been prepositioned laterally of conveyor 26 such that its short side remote from accumulation region 34 follows the same line or path. That line is near that side of conveyor 28 remote from the accumulation region.

Figure 3:
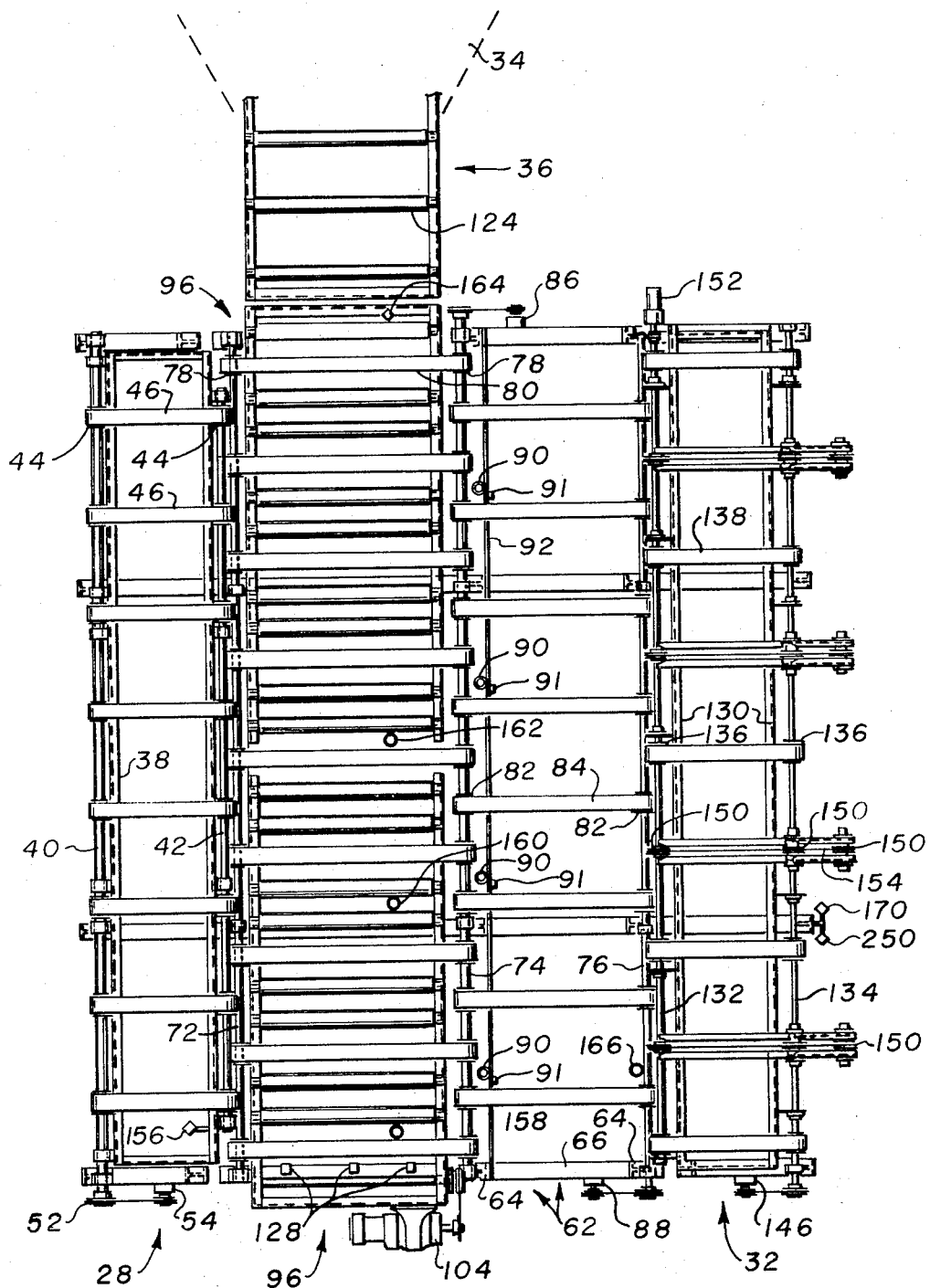
FIG. 3 is a plan view of FIG. 2 taken on line 3—3 to show the conveyors in the transfer region and extending toward the accumulation region as in FIG. 1b, including sensor positioning.

Referring to FIGS. 2 and 3, pivoting reject conveyor 28 comprises a conveyor table supported by appropriate support means. The conveyor table includes a rigid rectangular table frame 38 on which are rotatably supported a pair of spaced parallel shafts 40 and 42. Shafts 40 and 42 extend transversely of main transport path 12 with shaft 40 rearward, or upstream, of shaft 42 and both include pulleys 44 mounted therealong at spaced intervals. Shafts 40 and 42 are typically spaced 2½ to 3 feet apart and extend 17 to 18 feet. Pulleys 44 are typically spaced at 2 foot intervals along the shafts. Pulleys 44 on shaft 40 are secured against rotation relative thereto. Endless belts 46 are mounted on and extend between respective pairs of pulleys on shafts 40 and 42. The uppermost surface of belts 46 provide support surface on which and by which wallboard books 22 are transported. Each belt is tensioned by a tensioning mechanism, such as a counterweight assembly.

Table frame 38 is pivotably suported on a suitable rigid floor mounted support frame 48 for pivotal rotation about rear shaft 40. Shaft 40, and table frame 38 generally are spaced several feet above floor level 49. One or more fluid driven piston and cylinder combinations 50 serve to control the pivotal orientation of frame 38. Actuation of piston and cylinder 50 is controlled by solenoid 51. Each cylinder 50 is pivotably mounted at one end to the support frame 48 below and behind shaft 42 and the piston rod is pivotably connected to frame 38 near shaft 42.

The positioning and stroke length of pistons and cylinders 50 are such that the table frame 38 may be pivoted from a first position in which the upper surface of belts 46 is substantially horizontal and defines part of main transport path 12 to a second position in which the belts are inclined downwardly about 20° to the horizontal, shown in phantom in FIG. 2. Absent energization of solenoid 51, the piston rod is extended and table frame 38 is in the first position. Solenoid energization actuates the table frame to the second position.

Shaft 40 serves to drive belts 46 through a chain and sprocket connection with a floor mounted motor 54. Motor 54 is unidirectional and is connected with shaft 40 to drive the uppermost surface of belts 46 from shaft 40 toward shaft 42. Thus conveyor 28 receives books 22 from conveyor 26 near shaft 40 and transports them toward shaft 42.

Fixed conveyor 30 of the main transport path 12, as seen in FIG. 1a and 2, is similar to conveyor 26 and includes a plurality of laterally spaced endless belts 56 extending and driven in the direction of the main path. Belts 46 are mounted on pulleys 58 which are mounted on shafts supported by table frame 60. Unidirectional motor 61 is drivingly connected to one of the shafts to rotate pulleys 58 and drive belts 56. Table frame 60 is fixedly supported by a floor mounted support frame, not shown, and is spaced several feet above floor level 49.

A conveyor 62 is spaced below conveyor 30 and above floor level 49 and extends in substantially the same direction as conveyor 30 parallel thereto. Conveyor 62 comprises a conveyor table portion supported by appropriate support means. A table framework 64 is fixedly supported by and mounted on a support frame 66. Support frame 66 is floor mounted and may be rigidly affixed to the floor or may include means for some slight attitude adjustment.

Table frame 64 might include only a single set of power driven support elements, such as belts, operating about pulleys on shafts spaced at opposite ends of the table frame. However, in the preferred embodiment, three spaced, parallel shafts 72, 74 and 76 are rotatably mounted on the table frame 64. Each shaft extends horizontally in the same plane and parallels the shafts 40 and 42 of pivoting conveyor 28. Pulleys 78 are mounted on shafts 72 and 74 at spaced intervals and endless belts 80 are mounted thereon. Pulleys 82 are mounted on shaft 76 at spaced intervals and on shaft 74 intermediate pulleys 78 and endless belts 84 are mounted thereon. Pulleys 78 on shaft 74 are keyed or locked to the shaft to rotate therewith and pulleys 82 on shaft 74 are free to rotate relative thereto. Pulleys 82 on shaft 76 are keyed or locked thereto against rotation relative thereto.

Shaft 74 serves to drive belts 80 through a chain and sprocket connection with motor 86. Motor 86 is unidirectional, is mounted on support frame 66 and is connected with shaft 74 to drive the uppermost surface of belts 80 from shaft 72 toward shaft 74.

Shaft 76 serves to drive belts 84 through a chain and sprocket connection with motor 88. Motor 88 is unidirectional, is mounted on support frame 66 and is connected with shaft 76 to drive the uppermost surface of belts 84 from shaft 74 toward shaft 76. The use of separate motors 86 and 88 to separately drive belts 80 and 84 respectively allows conveyor 62 to be operated and viewed as comprising two subtables or subconveyors.

The positioning of table frame 64 is such that shaft 42 of conveyor 28 is juxtaposed with shaft 72 when table frame 38 is actuated to its second or inclined position such that conveyors 62 and 32 are in member or book transferring registration. Preferably, pulleys 44 are positioned relative to pulleys 78 such that they alternate laterally. The width of the support surface defined by belts 80 and 84 is substantially the same as and in line with that defined by belts 56. The spacing between shafts 72 and 74, and 74 and 76 is about 4½ feet in both instances. The separately driven sets of belts 80 and 82 serve to divide conveyor 62 into two subtables or subconveyors.

Retractable edge stops 90 are mounted in vertically extending orientation at spaced intervals along a laterally extending support member 92 of support frame 66. Edge stops 90 are hydraulically or pneumatically actuable rollers extendable from a position entirely below the uppermost surface of belts 80 and 84 to a position an inch or two thereabove upon command. Support member 92 is positioned near and below shaft 74 and edge stops 90 are mounted thereto to be extendable upward near, but clear of, shaft 74. Edge stops 90, when extended upward, prevent books 22 from traveling beyond belts 80 and onto belts 84. A solenoid 91 controls the actuating mechanism for stops 90 such that they are in the raised operative position when solenoid 91 is energized.

An elevatable conveyor 96 is constructed and oriented such that it extends at 90° to the direction of travel of belts 80 on conveyor 62. Conveyor 96 is normally positioned slightly below the uppermost surface of belts 80 and is coextensive with conveyor 62 laterally thereof. Conveyor 96 extends longitudinally from that lateral extent of conveyor 62 most remote from accumulation region 34 to, and possibly beyond, that lateral extent of conveyor 62 nearest the accumulation region. This arrangement creates a region of lateral coextensivity between conveyor 96 and conveyor 62.

Figure 6:
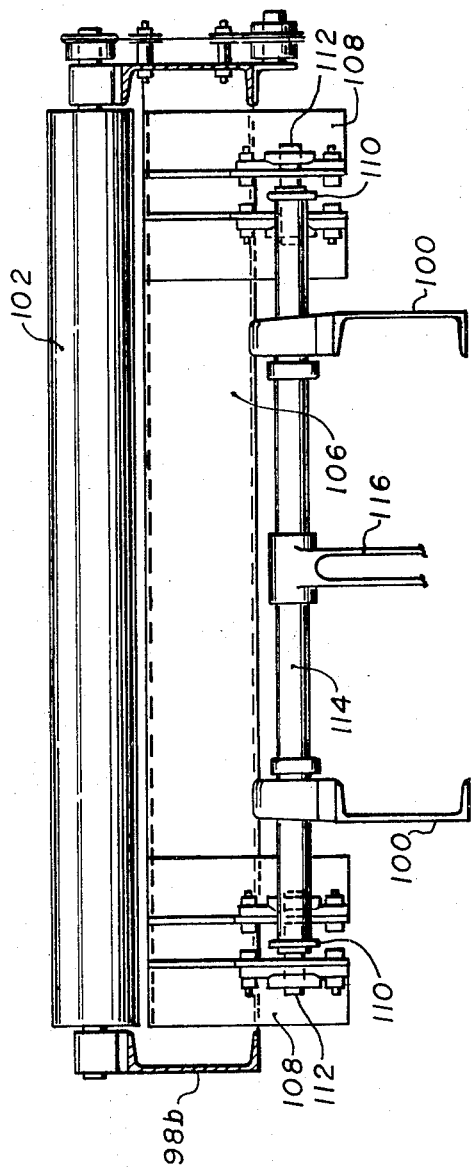
FIG. 6 is a sectional view of FIG. 4 taken along line 6—6 showing a portion of the conveyor lifting mechanism in greater detail.
Figure 4:
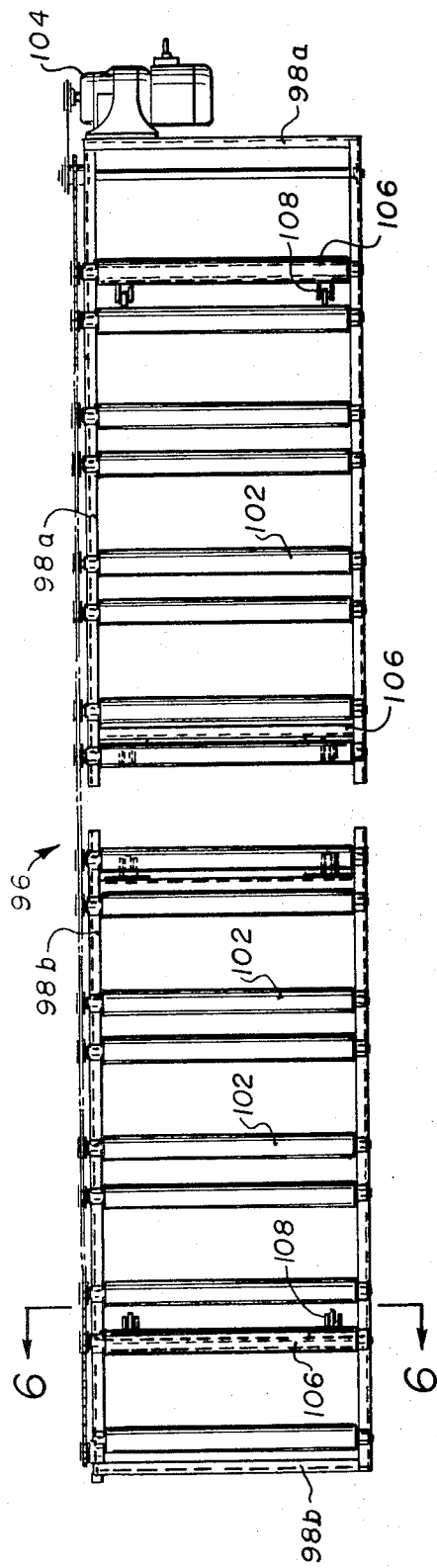
FIG. 4 is a plan view of the elevatable roll conveyor which extends from the transfer region toward the accumulation region.
Figure 5:
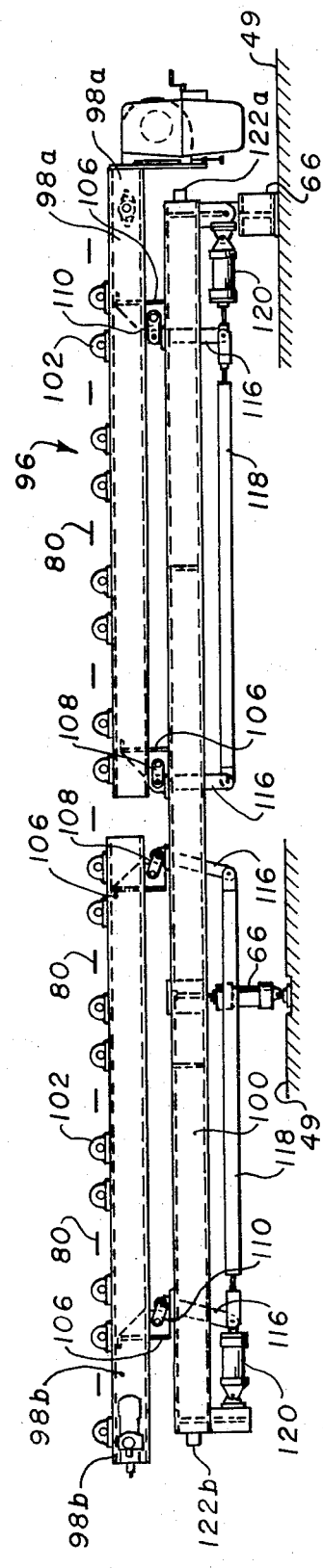
FIG. 5 is an elevational view of the conveyor of FIG. 4 viewed transversely of the direction of roll motion.

Conveyor 96, while it might be a single elevatable frame, preferably is comprised of at least two frames or subframes and associated book supporting elements, as seen in FIG. 4, for reasons to become evident hereinafter. Conveyor 96 comprises two rectangular table frames 98a and 98b arranged in series and supported by and elevatable relative to channel support members 100 which extend laterally of conveyor 62 and are affixed to and supported by support frame 66. Table 98a is the more remote of the two relative to accumulation region 34. Each table frame 98a and 98b includes a plurality of book 22 supporting and propelling elements, such as rolls 102, sized and positioned to operate and be vertically moved intermediate adjacent belts 80. The axis of each roll 102 parallels the direction of travel of belts 80. The rolls 102 are mounted for rotation in supports which extend upwardly somewhat above frames 98a and 98b proper, as seen in FIGS. 5 and 6. Further, rolls 102 are interdigitally arranged with belts 80 such that one, or preferably two, rolls exist intermediate each adjacent pair of belts. Each of the rolls 102 on both table frames is driven by a chain and sprocket connection with motor 104 mounted on table frame 98a. The relative vertical movement between table frames 98a and 98b is small enough that a single chain suffices to drive the rolls on both tables. Motor 104 is reversible such that the direction of rotation of rolls 102 may be controlled to propel a book 22 thereon either toward or away from accumulation region 34. The width of table frames 98a and 98b and their associated rolls 102 and sprockets is somewhat less than the distance between a pulley 78 on shaft 72 and one on shaft 74. This allows frames 98a and 98b and associated rolls 102 to be moved vertically from a position in which the uppermost and supporting surfaces of the roll is normally somewhat below (1/2 inch) that of belts 80, as table 98a in FIG. 5, to one in which the surface is somewhat above (1/2 inch) that of belts 80, as table 98b in FIG. 5.

Referring further to FIGS. 5 and 6, the mechanism for controllably elevating tables 98a and 98b is depicted therein. Rigid support members 106 are affixed to and extend across both table frames 98a and 98b near both ends of each below the level of rolls 102. A pair of support brackets 108 are affixed to each support member 106, one near each lateral extreme. Rigid lifting links 110 are pivotably joined to each bracket by clevis pins 112 passing through a hole at one end of each link 110 and through a hole or holes in the bracket. The other end of each lifting link is rigidly affixed to a shaft 114 extending substantially the full width of frames 98a and 98b, with a pair of links 110 associated with a particular support member 106 being joined to the same shaft. Links 110 may be joined to the shaft 114 against rotation relative thereto by welding, set screws, keying or the like. Each shaft 114 is supported in bearing mounts on channel support members 100 and may rotate about an axis paralleling rolls 102. A lifting arm 116 is joined at one end with shaft 114 in a manner preventing relative rotation therebetween, as by a keying or set screw arrangement. Link 110 is oriented at about 90° to lifting arm 116 on shaft 114 and when link 110 extends substantially horizontally, lifting arm 116 extends downward from the shaft. A rigid connecting rod 118 extends between each pair of lifting arms 116 associated with tables 98a and 98b respectively. The connecting rods 118 are pivotably joined to the lower or free ends of each respective pair of lifting arms 116.

A fluid actuated, solenoid controlled, piston and cylinder combination 120 is associated with each of tables 98a and 98b to drive or actuate their respective connecting rods 118 and thereby raise or lower the associated table and roll 102. Each cylinder 120 is pivotably connected to the support frame 66 and the associated piston rod is pivotably joined with either its corresponding connecting rod 118 or lifting arm 116 or both. In FIG. 5, the piston rod joins the connecting rod and a lifting arm at a common junction.

The relative orientations of piston and cylinder 120, connecting rod 118, lifting arm 116 and lifting links 110 are such that, when piston 120 is in its extended position, the lifting links 110 are horizontal and the table and rolls 102 are in the "down" or "lowered" position, as table 98a in FIG. 5. When piston 120 is in its retracted position, the lifting links 110 are inclined upward from shaft 114, thereby placing the table and rolls 102 in the "up" or "raised" position. As noted earlier, rolls 102 are above belts 80 when in the "raised" position and below them when in the "lowered" position.

A solenoid 122a controls actuation of the piston and cylinder combination 120 for table 98a and a solenoid 122b serves the same function for table 98b. Absent solenoid energization, the corresponding piston rod is extended and the rolls 102 are in the normally lowered position. Solenoid energization raises the corresponding table.

It might be noted that the bottom return path of belts 80 on conveyor 62 is routed such that they don't interfere with the operation of tables 98a and 98b of conveyor 96 and vice versa.

Conveyor 62 defines the horizontal extent of a transfer region spaced below conveyor 30. The uppermost book-carrying surface of rolls 102, in the raised position, define the upper boundary of the transfer region and the lower boundary is spaced therebelow. It will be appreciated that conveyor 62 might be only a single table and further, might only extend substantially the width of conveyor 96.

If the accumulation region 34 is closely adjacent the side of conveyor 62, as in FIG. 1a, conveyor 96 may be comprised only of tables 98a and 98b. If accumulation region 34 is spaced laterally of conveyor 62, as in FIG. 1b, conveying means are needed to span the space. These conveying means may be an integral part of conveyor 96 or may be an extension thereto, as the tipple conveyor 36 seen in FIG. 1b and FIG. 3. Tipple conveyor 36 might be pivotable about a horizontal axis near conveyor 62 or it might be fixedly mounted. In either event, the surface for supporting and transporting books 22, such as rolls 124, must be at the same elevation adjacent table frame 98b as the rolls 102 of said table in the raised position. Tipple conveyor 36 includes means for controllably driving its rolls 124 in unison with rolls 102. This may comprise driving rolls 124 with motor 104, or with a separate bidirectional motor 126 seen in FIG. 1b.

End stops 128 are mounted on that side of table frame 64 remote from the accumulation region 34. The end stops may be stationary shock absorbers positioned to yieldingly stop books 22 returning from accumulation region 34 as they arrive at the end of conveyor 96 remote from the accumulation region. Typically, end stops 128 are mounted on part of frame 64 or frame 66 and are only in or along that area which is aligned with the end of conveyor 96.

Referring again to FIGS. 1a, 2 and 3, pivoting reclaim conveyor 32 comprises a conveyor table supported by appropriate support means, of a type and in a manner quite similar to reject conveyor 28. The conveyor table includes a rigid rectangular table frame 130 on which are rotatably supported a pair of spaced parallel shafts 132 and 134. Shafts 132 and 134 extend transversely of main transport path 12, with shaft 132 rearward, or upstream, of shaft 134. Both shafts 132 and 134 include several pulleys 136 mounted therealong at spaced intervals. Shafts 132 and 134 are typically spaced 2½ to 3 feet from one another and extend 17 to 18 feet. Pulleys 136 are typically spaced at 2 foot intervals along the shafts. Pulleys 136 on shaft 134 are secured against rotation relative thereto. Pulleys 136 on shaft 132 are free to rotate relative thereto. Endless belts 138 are mounted on respective pairs of pulleys on shafts 132 and 134. The uppermost surface of belts 138 provide a support surface on which and by which wallboard books 22 are transported. Each belt is tensioned by a tensioning mechanism, such as a counter weight assembly.

Table frame 130 is pivotably supported on and by a suitable rigid floor mounted support frame 140 for pivotal rotation about downstream shaft 134. Shaft 134, and table frame 130 generally are spaced several feet above floor level 49. One or more fluid driven piston and cylinder combinations 142, serve to control the pivotal orientation of frame 130. Actuation of piston and cylinder 142 is controlled by solenoids 144 and 145. Each cylinder 142 is pivotably mounted to support frame 140 below and forward, or downstream, of shaft 132 and its associated piston rod is pivotably connected to table frame 130 near shaft 132. Piston and cylinder combination 142 is double acting, being connectable at opposite ends of the cylinder with a source of hydraulic fluid, not shown, by means of a conventional four-way valve, not shown, having three operative positions.

Control of the valve, and accordingly, control of the actuation of the piston 142 is effected through solenoids 144 and 145. Energization of solenoid 144 moves the valve to one of its three positons to move the piston in one direction, energization of solenoid 145 moves the valve to another of its positions to move the piston in the other direction and when neither solenoid is energized, th valve is in its third position which blocks flow of hydraulic fluid and stops the piston 142 at the position occupied at the time of de-energization of the solenoids.

The positioning and stroke length of a piston and cylinder 142 is such that the table frame 130 may be pivoted from a first or raised limit position in which the upper surface of belts 138 is substantially horizontal and defines part of the main transport path 12 to a second or lowered limit position in which the belts are inclined downwardly about 20° to the horizontal, shown in phantom in FIG. 2. Energization of solenoid 144 serves to extend the piston rod to place table frame 130 in its first position and energization of solenoid 145 causes retraction of the piston rod to move the table frame to its second limit position. If both solenoids 144 and 145 are de-energized when the table frame 130 is at a position intermediate the first and second limit positions, it will stop thereat. This position, which will be referred to as an "intermediate" position, is controllably variable between the first and second limit positions, an example being shown in phantom in FIG. 2 above the lower limit position, also shown in phantom. This capability of positioning table frame 130 intermediate the first and second limit positions will be utilized in a manner disclosed later herein.

Shaft 134 serves to drive belts 138 through a chain and sprocket connection with a floor mounted motor 146. Motor 146 is unidirectional and is connected with shaft 134 to drive the uppermost surface of belts 138 from shaft 132 toward shaft 134.

Table frame 130 is positioned immediately downstream of conveyor 30 in juxtaposition therewith and, when in its second position, is also immediately downstream of the downstream, or discharge, end of conveyor 62. When table frame 130 is actuated to its second position, its shaft 132 is juxtaposed with shaft 76 of conveyor 62 such that conveyors 62 and 32 are in member or book transferring registration. Preferably, pulleys 136 are positioned relative to pulleys 82 such they alternate laterally. The width of the support surface defined by belts 138 is substantially the same as and laterally in line with that defined by belts 84.

Conveyor 32 may additionally include several laterally spaced arms 148 extending downstream from the downstream, or discharge, end of table frame 130. Arms 148 are pivotably mounted on shaft 134 and may be individually pivoted downwardly from a horizontal position, by means not shown, as seen in phantom in FIG. 2. Arms 148 include sprockets 150 rotatably mounted at their downstream ends. Shafts 132 and 134 also include sprockets 150, mounted thereon with the sprockets being free to rotate relative to shaft 134 but bieng locked against rotation relative to shaft 132. Endless chains 154 are mounted on sprockets 150, with a fluid motor 152 connected to shaft 132 to drive the uppermost chain portion in the downstream direction. Pusher dogs (not shown) extend up from chains 154 to engage the trailing edge of wallboard books 22 when they are entirely onto belts 138. The pusher dogs urge each book 22 into contact with bundler 23 so that they may be taped or joined together thereat. The arms 148 may be individually depressed to accommodate an adjustably movable side of the bundler. This type of mechanism for urging books into contact with the bundler generally has been known in the art.

Various means are employed for sensing or detecting the presence of a board member 16 or book 22 at a particular location or the existence of a pivoting conveyor in a particular orientation.

FIGS. 2 and 3 diagrammatically illustrate the positionings of several photocells and several limit switches. Each photocell sensor typically includes a light transmitter and receiver mounted under conveyor 30 above conveyors 62 and 96 and directed downward at an upwardly directed reflector positioned under conveyors 62 and 96. An optically clear path normally exists between the pnotocell and reflector unless a book 22 passes therebetween and breaks the beam. These photocells, depicted in later circuitry, are assumed to be in their inactive, or normal, state when a return light beam is sensed and in their "energized" or actuated state when the beam is broken. The limit switches are any of a variety of well known types of limit switches which include means for actuating the switch when contacted by or in close proximity with books 22. Typically, the limit switches are mounted below the travel path of the books 22 to be sensed and have contact actuating means extending up into the path of travel for controlling switch actuation.

Limit switch 156 is positioned somewhat upstream of the discharge end of conveyor 28, and laterally is near that side of conveyor 28 or main transport path 12, which is remote from accumulation region 34.

Photocells 158, 160 and 162 are all positioned for use in the region of lateral coextensivity between conveyors 62 and 96. Photocell 158 is positioned to sense a book 22 as it arrives at or near the discharge end of conveyor 96 in the reclaim mode of operation. It is approximately mid-way between shafts 72 and 74 and near that end of conveyor 98 and side of conveyor 62 most remote from accumulation region 34. Photocell 160 is about mid-way between shafts 72 and 74, or possibly closer to the latter, and is over table frame 98a sufficiently close to photocell 158, relative to accumulation region 34, to sense the presence of the shortest board 16 or book 22 which might be manufactured when it arrives on belts 80 from conveyor 28. Photocell 162 is about midway between shafts 72 and 74, or possibly closer to the latter; and is over that end of table frame 98b remote from accumulation region 34 to indicate when a book 22 moving toward accumulation region 34 has entirely vacated rolls 102 on table frame 98a. The photocells may be moved in the horizontal plane to obtain the optimum positioning.

A limit switch 164 is positioned at or near that end of table frame 98b of conveyor 96 closest to accumulation region 34 and is between shafts 72 and 74. Limit switch 164 serves to sense or indicate when the leading and/or trailing edge of a book 22 moving toward the accumulation region 34 leaves the table frame 98b portion of conveyor 96.

A photocell 166 is positioned above conveyor 62 near the side remote from accumulation region 34 and near shaft 76. This positioning of the photocell serves to detect the presence of any book 22 at the discharge end of conveyor 62.

Limit switch 168, unlike the others herein described, senses the orientation of a conveyor table frame rather than book location. Limit switch 168, seen most significantly in FIG. 2, may be supported by support frame 140 and is positioned to be actuated by table frame 130 of conveyor 32 oriented in its downwardly inclined second position. The lateral positioning of switch 168 is not particularly significant and thus does not appear in FIG. 3.

Limit switch 170 is supported by some portion of conveyor 32 in a position adapted to be actuated by a book 22 of any width when its leading edge is near, and preferably downstream of shaft 134. This limit switch, as with the others, remains actuated until the book completely passes.

It will be evident that additional sensing means may be employed at other points in the overall manufacturing and transport system, as for instance in controlling the operation of the dog-carrying chains 154. However, as such parts of the system are known in the prior art, and a detailed description of their operation is not essential to an understanding of the invention, their further description has been omitted.

Figure 7:
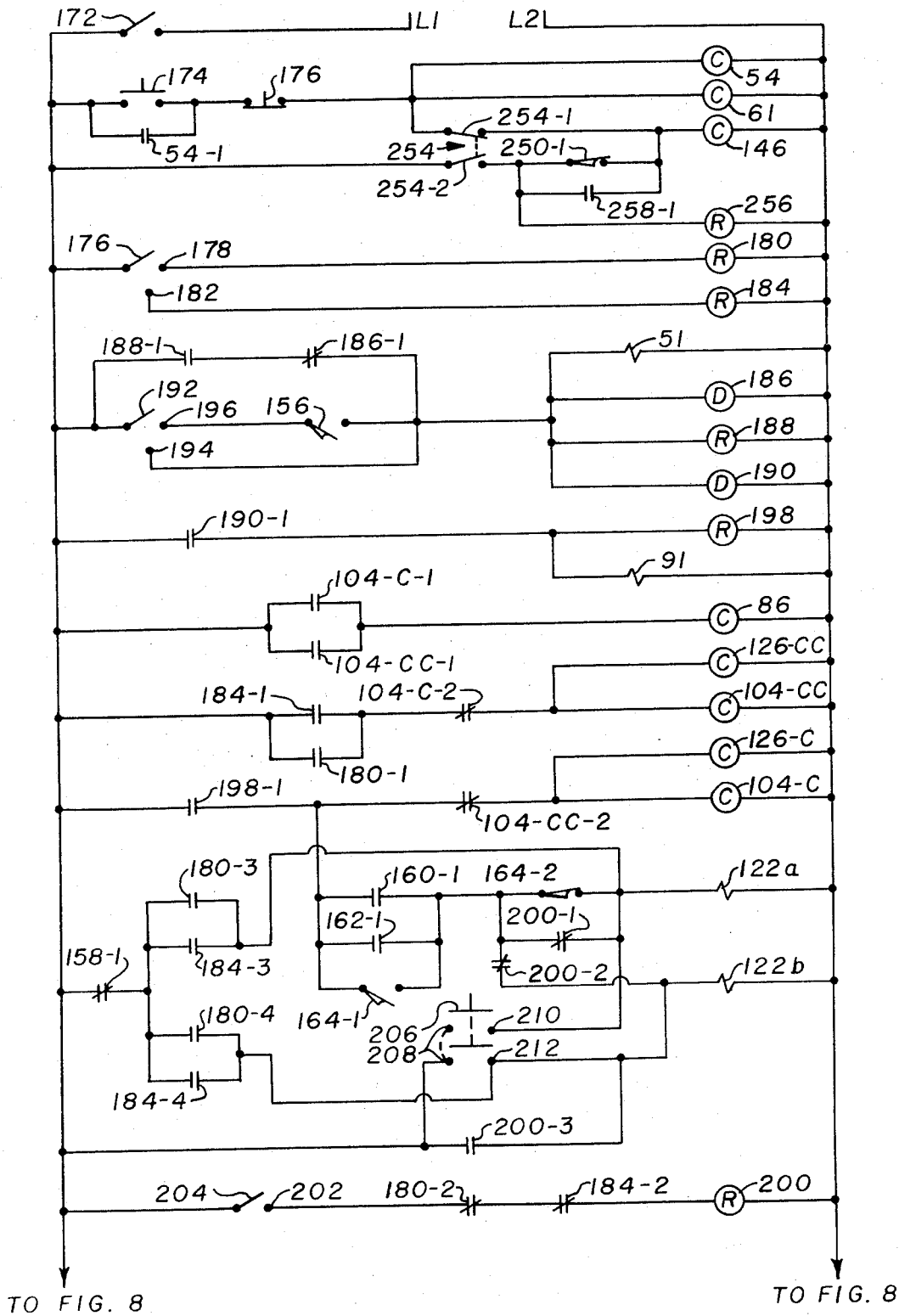
FIGS. 7 and 8, in combination, are a simplified schematic diagram of the electrical circuits of the apparatus to illustrate the manner in which the operation of the conveyors is controlled.
Figure 8:
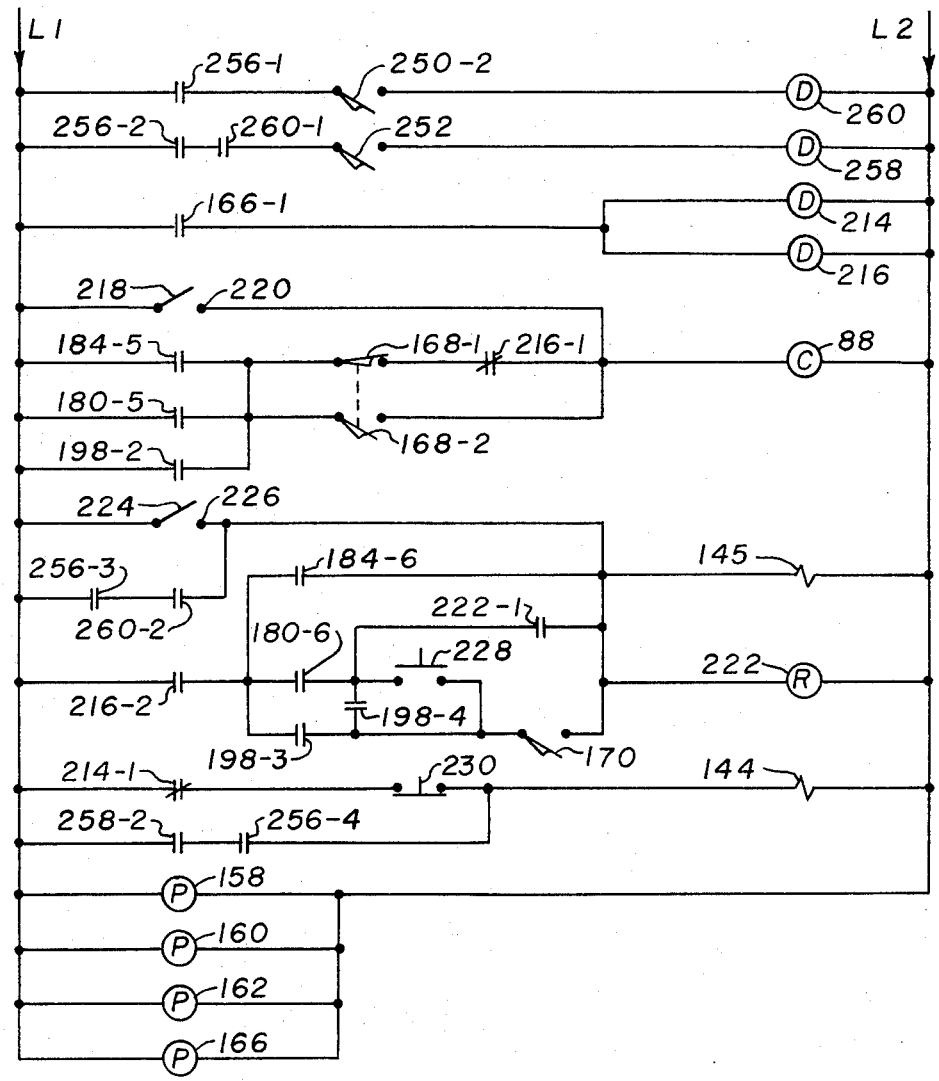

Referring to FIGS. 7 and 8, there is depicted in somewhat simplified diagrammatic form the electrical circuitry required to control the operation and synchronization of the conveyors providing the reject and/or reclaim capability. $L_1$ and $L_2$ are two power line conductors, typically 120 V AC, across which are connected the various logic and control elements. The symbols bearing the same numbers as the several above-mentioned motors are not the motors themselves, as they would likely be in a separate circuit, but represent the motor controllers which include solenoids for operating the power contacts to the motors, thus controlling operation of the motors.

Switch 172, when manually closed, applies the potential between line conductors $L_1$ and $L_2$ to the logic. Motors 54, 61 and 146, respectively associated with conveyors 28 and 30 and 32 are energized to drive their belts when a circuit including their motor controllers 54, 61 and 146 is completed by closing pushbutton switch 174. Normally open contacts 54-1 are closed by energization of the solenoid of motor controller 54 and serve to maintain continuity in the circuit when pushbutton switch 174 is released. A manual pushbutton switch 176, in series therewith, is normally closed and may be momentarily opened to break the circuit and stop motors 54, 61 and 146. The motor controllers 54, 61 and 146 are shown here generally in parallel with one another. While motor controllers 54, 61 and 146 are here shown as controlled by a common switch, or switches, they might be separated for individual control.

Multiposition switch 176, here open, may be manually or otherwise actuated to close a circuit with contact 178 and thereby energize relay 180 or it may be actuated to close a circuit with contact 182 and thereby energize relay 184. Relay 180, when energized, serves to control and indicate operation in an "automatic reclaim mode." Relay 184, when energized, serves to control and indicate operation in a "manual reclaim mode." It should be here noted that the contacts associated with and controlled by a particular relay or photocell are given the same number as their corresponding relay or photocell. Plural contacts associated with a single driver include an additional identifying digit.

Solenoid 51, time delay relay 186, relay 188 and another time delay relay 190 are connected in parallel with one another and their energization is controlled by any of three parallel arms or circuits connected in series therewith. A multiposition switch 192 may be actuated to close a circuit with contact 194 to provide current to one of the three parallel arms. Switch 192 may be actuated to close a circuit with contact 196 in another of the three parallel arms, this arm also including in series normally open limit switch 156. The third of these parallel arms includes, in series, normally open relay contact 188-1 and normally closed contact 186-1.

The delay in time delay relay 186 is such that contact actuation occurs a delayed period after energizing current is applied to the relay. Conversely, the delay in time delay relay 190 occurs following the de-energization of the relay.

A relay 198 is connected in parallel with solenoid 91 and they are connected in series with normally open relay contacts 190-1 which controls their energization.

The controllers for obtaining counterclockwise motion of motors 104 and 126 are indicated as 104-*cc* and 146-*cc* respectively. Such rotation of the motors results in motion of the corresponding rolls in a direction to convey books 22 away from accumulation region 34 to reclaim them. Correspondingly, controllers 104*c* and 126*c* effect clockwise rotation of their respective motors to effect movement of books 22 toward the accumulation region during rejection. Controllers 104-*cc* and 126-*cc* are connected in parallel with one another and are in series with normally closed contacts 104-*c*-2 and with paralleled normally open contacts 184-1 and 180-1. Controllers 104*c* and 126*c* are connected in parallel with one another and in series with normally closed contacts 104-*cc*-2 and normally open contacts 198-1. Motor controller 86 is connected across lines $L_1$ and $L_2$ in series with paralleled normally open contacts 104-*c*-1 and 126-*c*-1.

Each of photocells 158, 160, 162 and 166 are shown as connected across power lines $L_1$ and $L_2$.

The elevational control of table frames 98*a* and 98*b* is operative in two modes, one in which board members 16 are no more than a certain length, in this instance 8 feet, and the other in which they exceed that length. A relay 200 is connected across lines $L_1$ and $L_2$ in series with normally closed contacts 180-2, 184-2 and switch contact 202. Switch contact 202 is associated with switch 204. Switch 204 must be closed for handling books or members of 8 feet or less and remains open for larger members.

Solenoids 122*a* and 122*b* are controlled by a somewhat complex logic network. One circuit connecting solenoid 122*a* between lines $L_1$ and $L_2$ includes one side of the solenoid connected to $L_2$ with the other side connected in series with paralleled normally open contacts 180-3 and 184-3 in turn in series with photocell contacts 158-1 which is connected to $L_2$. A similar circuit connects solenoid 122*b* between lines $L_1$ and $L_2$ and includes one side of the solenoid connected to $L_2$ with the other side connected in series with paralleled normally open contacts 180-4 and 184-4 in turn in series with contacts 158-1.

Another circuit connecting solenoid 122a with line L₁ includes contacts 198-1, connected to line L₁, connected in series with paralleled and normally open contacts and limit switch 160-1, 162-1 and 164-1, respectively, in turn connected in series with paralleled and normally closed limit switch and contacts 164-2 and 200-1 respectively, in turn connected to solenoid 122a. The same circuit including contacts 198-1, 160-1, 162-1 and limit switch 164-1 is connected to solenoid 122b; however, switch 164-2 and contacts 200-1 are bypassed and replaced instead with normally closed contacts 200-2 connected to the solenoid.

Direct completion of an energizing circuit to both solenoids 122a and 122b may be effected with manually actuated double pole switch 206. Switch 206 may be actuated to a position which closes a circuit between contacts 208 and 212 connected respectively to solenoids 122a and 122b.

A further energizing circuit for solenoid 122b is provided by a series path from the solenoid through normally open contacts 200-3 to line L₁.

A pair of time delay relays 214 and 216 in parallel are connected to line L₁ through normally open photocell contacts 166-1. The delay associated with relay 214 occurs after its de-energization and that associated with relay 216 occurs just after the relay is energized.

Energization of motor controller 88 is controlled by any of several circuits connecting the controller with line L₁. One circuit simply comprises a switch 218 which may be actuated to close a circuit with contact 220. Another circuit includes normally open contacts 184-5, 180-5 and 198-2 in parallel with one another and in series with normally closed limit switch 168-1 and normally closed contacts 216-1. Another circuit also includes contacts 184-5, 180-5 and 198-2 connected in parallel and normally open limit switch 168-2 in series therewith.

Solenoid 145 is connected in parallel with relay 222 and their energization is controlled by any of several circuits connecting them with line L₁. One circuit simply employs a siwtch 224 which may be actuated to close a circuit with contact 226. Another circuit includes normally open contacts 216-2 in series with normally open contacts 184-6. Still another circuit comprises contacts 216-2 in series with several parallel paths to the solenoid and relay, one path comprising normally open contacts 180-6 and 222-1 in series, another path comrpising contacts 180-6, normally open pushbutton 228 and normally open limit switch 170 in series, another path comprising normally open contacts 198-3 and limit switch 170, and another path comprising contacts 198-3, normally open contacts 198-4 and contacts 222-1 in series.

Solenoid 144, which returns table frame 130 to its first position when energized, is connected to line L₁ through the series combination of normally closed pushbutton switch 230 and normally closed contacts 214-1.

There follows now a description of the operation of the several conveyors in performing the book rejecting and reclaiming functions. Reference is made both to the circuitry of FIG. 7 and the structures depicted in the earlier figures.

Initially switch 172 is closed to provide line potential on lines L₁ and L₂ to the logic. Pushbutton switch 174 is momentarily depressed to energize motor controllers 54, 61 and 146, and accordingly, their respective motors. Of course the drive controls for the bulk of the manufacturing and conveying process will also have been engaged. Energization of motors 54, 61 and 146 permits use of conveyors 28, 30 and 32 in the main transport path 12. This is the normal mode of operation of the system. To reject a book 22, the system is placed in a "reject" mode of operation having automatic and manual submodes and to reclaim a book, the system is placed in a "reclaim" mode of operation also having automatic and manual submodes.

Typically, an operator will be stationed near, or upstream of, conveyor 28 and will be charged with detecting any defective members 16, whether in a book 22 or not. If a defective member or book is spotted, the operator would enter either the "manual reject" mode or the "automatic reject" mode by actuating switch 192 to close the circuit with contact 194 or 196 respectively. If the circuit with contact 194 is closed, solenoid 51, and relays 186, 188 and 190 will be immediately energized whereas their energization will depend on limit switch 156 being closed if switch 192 is positioned to close the circuit with contact 196. Upon energization of solenoid 51, conveyor 28 pivots downward to its second position. In the "automatic reject" mode this operation is delayed until a book 22 closes limit switch 156. Limit switch 156 is preferably positioned such that at least a portion of the actuating book 22 is supported by conveyor 28 before it begins to pivot downward. In the "manual" mode, the operator selects the moment at which conveyor 28 pivots downward. The circuit including contacts 188-1 and 186-1 serves to insure a current path to solenoid 51, and relays 186, 188 and 190 for a certain minimum period following their initial energization.

Upon entry into "the reject" mode, relay contact 190-1 will close, thus energizing relay 198 and solenoid 91. Solenoid 91 now allows the actuating mechanism associated with edge stops 90 to elevate the stops to their raised operative position. Energization of relay 198 closes contact 198-1 which thus energizes motor controllers 104-c and 126-c, assuming that motor controller 104-cc is not currently energized. Energization of these motor controllers causes the rollers 102 and 124 associated with conveyors 96 and 36 respectively to rotate in the direction required to transport a book 22 toward accumulation region 34. At the same time energization of controller 104-c closes contact 104-c-1 to energize the motor controller 86 which causes the belts 80 on conveyor 61 to move in the direction required to receive a book 22 from conveyor 28.

As earlier mentioned, board members 16 are made in different lengths, with but a single length occurring during a particular run. Table frame 98a and its rolls 102 are sized to accommodate member length up to 8 feet. Table frames 98a and 98b in combination can accommodate member length to about 16 feet. If the length of members 16 is 8 feet or less, the operator actuates switch 204 to close a circuit with contact 202, if the length is greater than 8 feet the switch is left open. In the "reject" mode contacts 180-2 and 184-2 remain closed and relay 200 is energized only if switch 204 is set for lengths of 8 feet and less.

When this occurs, contacts 200-3 are closed thus energizing solenoid 122b elevates table frame 98b of conveyor 96. Thus, table frame 98b remains elevated during the entire "reject" mode if member or book length is 8 feet or less.

As soon as book 22 is entirely, or nearly entirely, on belts 80, those rolls 102 of conveyor 96 not already elevated are elevated above the belts to support the book thereon and transport it to accumulation region 34. If the books 22 are 8 feet or less and table frame 98b is already elevated, solenoid 122a will be energized to elevate table frame 98a when the book breaks the beam of photocell 160 or 162 and closes contacts 160-1 or 162-1, contacts 198-1 having been previously closed. It is evident that the placement of these photocells and the various mechanical delays will determine when the table frame is elevated relative to book travel.

If the length of book 22 exceeds 8 feet and switch 204 is open, contacts 200-3 will remain open and solenoid 122b will be energized, through contacts 200-2, at the same time as solenoid 122a. In this instance, book 22 spans all of frame 98a and a portion of 98b and rolls 102 of both are initially below belts 80 and are raised simultaneously by the breaking of the light beam of photocell 160 or 162. With either length range, the rolls 102 rotate during the entire "reject" mode and thus propel books 22 as soon as they are supported thereon.

The operator or mechanical means may receive and remove rejected books 22 from the discharge end of conveyor 36.

If desired, double pole switch 206 may be actuated to close circuits with contacts 210 and 212 and there control the raising and lowering of rolls 102 of conveyor 96.

In rejecting books 22 of a length greater than 8 feet, solenoids 122a and 122b will be energized to maintain table frames 98a and 98b elevated until the trailing edge of the book passes limit switch 164, permitting 164-1 to open. Contacts 160-1 and 162-1 will have previously opened. When switch 164-1 opens, the table frames will return to their lowered positions. If books 22 are of 8 feet or less, table frame 98b remains up and tabel frame 98a descends when the leading edge of book 22 opens limit switch 164-2 to de-energize solenoid 122a.

Good books 22 in accumulation region 34, whether there through storage or repair of defective books may be returned to main transport path 12 by placing the system in the "reclaim" mode of operation. Generally speaking, the reclaim and reject modes are independent of one another and the operator will switch the system out of the "reject" mode before entering the "reclaim" mode. Prior to entering the reclaim mode, the operator, or some loading mechanism, must place the book 22 to be reclaimed on conveyor 36 near its end. Rolls 124 will of course be stopped as will rolls 102.

To enter the reclaim mode, the operator actuates switch 176 to close the circuit with either contact 178 or contact 182, the former representing the automatic reclaim mode and the latter the manual mode. The manual reclaim mode is best suited where no books 22 are on main path 12, whereas the automatic reclaim mode is best suited to introducing a reclaimed book into the main path in the vacancy created by a just-rejected book. In the reclaim mode, either relay 180 or 184 is energized. Correspondingly, one of contacts 184-1 and 180-1 will be closed and motor controllers 126-cc and 104-cc thus energized to cause rolls 124 and 102 to rotate in the direction required to transport a book 22 from the accumulation region 34 toward conveyor 62. At the same time, energization of controller 104-cc closes contacts 104-cc-1 to energize the motor controller 86 for driving belts 80.

Contacts 180-2 and 184-2 are opened in the reclaim mode such that relay 200 is not energized regardless of book length and accordingly, contacts 200-3 remain open and are ineffective to continuously maintain table frame 98b in the raised position. Both solenoids 122a and 122b are energized and de-energized to simultaneously elevate and lower table frames 98a and 98b. The solenoids are energized through contacts 158-1 and either 180-3 and 180-4 or 184-3 and 184-4 upon entering the reclaim mode. They remain energized until the leading end of a book 22 breaks the beam of photo-cell 158 and opens contacts 158-1.

Belts 84 of conveyor 62 are capable of being driven in either the reclaim or the reject mode, as evidenced by contacts 184-5, 180-5 and 198-2 in the circuit for controlling motor controller 88. Additionally, switch 218 may be manually actuated to energize the controller at any time. In either the "reject" or "reclaim" mode, energization of the controller 88 is determined by limit switch 168 which detects the orientation of conveyor 32 and by time delay relay 216. When conveyor 32 is in its downward section position, limit switch contacts 168-2 are actuated closed to energize the controller 88 and drive belts 84. When conveyor 32 is not in its downwardly inclined position, switch contacts 168-1 are closed and the controller is energized until and unless a book 22 breaks the beam of photocell 166 closing contacts 166-1 and energizing relay 216 which opens contacts 216-1.

The pivotal orientation of the table frame of conveyor 32 is controlled by solenoid 144 and 145, with the former being energized to raise table frame 130 to its first raised position and the latter being energized to lower the table frame to its second lowered position.

In the normal or main mode of operation, solenoid 144 is, or will have been, energized through closed contacts 214-1 and switch 230 to place table frame 130 in its raised or horizontal first position. The table frame will be lowered to receive a book 22 being reclaimed from the accumulation region 34 by energizing solenoid 145 at least long enough for the table to move to its second or lower limit position. This may be effected in several ways.

Manual actuation of switch 224 closes a circuit with contact 226 and directly energizes solenoid 145. Alternatively, the solenoid may be energized when a book 22 breaks the beam of photocell 216 and closes contacts 216-2 if various other conditions are satisfied. If the system is in the manual reclaim mode and contacts 184-6 are closed, the solenoid will be energized when (or shortly after) a book breaks the light beam. If the system is in the automatic reclaim mode, contacts 180-6 will be closed and the solenoid may be energized if, concurrently, switch 228 is manually actuated closed, a book is positioned to break the photocell beam and a book on main transport path 12 contacts limit switch 170 and closes it. Once relay 222 is energized, it closes contacts 222-1 which serve to maintain solenoid 145 energized until the book clears photocell 216, even though switch 228 or switch 170 may have opened in the interim. Finally, if the system is in the reject mode, contacts 198-3 will be closed, and if a book has been pre-positioned by an incomplete reclaim operation such that it breaks the beam of photocell 216, the solenoid will be energized when a book in main transport path 12 closes limit switch 170. Now-closed contacts 222-1 and 198-4 will serve to maintain the solenoid energized until the book passes photocell 216 even if limit switch 170 has reopened.

Through the discussion of the circuitry controlling the energization of solenoid 145, it is seen that one would probably operate in the manual reclaim mode if a series of books 22 are to be reclaimed and there are no books on main transport path 12. If there are books on path 12, but they, or some, are spaced adequately to accept a re-inserted or reclaimed book, the operator will generally operate in the automatic reclaim mode end each time a book on conveyor 62 is to be inserted into path 12, he will look for a sufficient void following a book on path 12 and depress switch 228 as that book nears limit switch 170. When the upper book closes switch 170, conveyor 32 inclines downward to receive the lower book and when the book clears the photocell the conveyor returns to the horizontal to insert the book.

If a substantially continuous line of books 22 appear on path 12, with only narrow gaps therebetween, it is necessary to await the space created by rejecting a book before a book being reclaimed may be inserted. This is the normal situation and the operator will previously have entered the automatic reclaim mode to move a book from accumulation region 34 to near the discharge end of conveyor 62, however he will not actuate switch 228 to its closed position to pivot conveyor 32 downward. Instead, the book 22 to be reclaimed arrives at the discharge end of conveyor 62, conveyor 32 has remained in its first position and the book breaks the beam of photocell 166 to energize relay 216 opening contacts 216-1. Motor 88 is stopped, stopping belts 84 and book 22 to await a void or space created by the next book rejected from the main path, which might occur at any time later. At that time, relay 190 will become energized, energizing relay 198 which closes contacts 198-3. Contact 216-2 will be closed because the beam is broken by the book at rest. A book 22 will be rejected and the book preceeding it on main path 12 contacts and closes limit switch 170 to pivot conveyor 32 downward. The spacing between reject conveyor 32 and limit switch 168 and the spacing between adjacent books 22 is such that the book immediately preceeding the book being rejected is the one which causes this particular actuation of the limit switch. Limit switch 168-2 is thus closed and motor 88 and belts 84 started to place the book on conveyor 32 which then pivots back to its first position, inserting the book into the main transport path 12.

The positioning of limit switch 156 and photocell 166 and the nature of the associated logic are such that conveyor 28 pivots downward only after a substantial portion of an oncoming book 22 is supported thereon to support as much of the book as possible during the complete operation and conveyor 32 pivots upward as soon as most of an oncoming book is supported thereon also to provide support for the book and to aid belts 138 in propelling the book. Because the operator may control the timing of pivotal operation of conveyors 28 and 32 in certain modes, it is desirable that he time his actuation to provide the above-mentioned support and driving power.

Referring now to the novel booking or stacking means and method of the invention, portions of the previously described transfer apparatus are utilized through the addition of some circuitry and sensing devices to be hereinafter described. As mentioned, it is sometimes desirable to stack or book two or more adjacent sheets of wallboard in a manner which results in the "smooth" side of each sheet facing in the same direction, for instance upward. This allows the resulting book to be transported to a station where a coating or covering, such as vinyl, may be applied to the upper or smooth surface without requiring the upper sheets to be inverted twice.

A pair of limit switches 250 and 252 are positioned along the main transport path 12, as seen in FIG. 2. Switch 250 is near or somewhat beyond the downstream end of pivoting conveyor 32 and has an actuating arm extending into the path of a member moving along the main path. The switch 250 is positioned laterally of the conveyor such that it is actuated by members of any width or length moving along path 12. Switch 250 may be positioned near the switch 170 earlier described. Limit switch 252 is positioned upstream of limit switch 250 and preferably upstream somewhat from conveyor 32. In a preferred embodiment, switch 252 is positioned near the downstream end of fixed conveyor 30 with an actuating arm projecting into the path of a member moving along path 12. It also is positioned laterally of the conveyor to be contacted by members of any length and width moving along a prescribed path.

The electrical circuitry of FIGS. 7 and 8 additionally includes the circuitry required to control the operation of conveyor 32 when it is used to perform a booking function. This additional circuitry was not previously described and includes means for controlling the stopping and starting of motor 146 which drives the belts 138 of conveyor 32 and for controlling the actuation of cylinder and piston 142 which pivotally positions the conveyor.

One contact 254-1 of a ganged, two contact switch 254 is connected in series with motor controller 146 and in parallel with controllers 54 and 61 as shown in FIG. 7. The other contacts 254-2 of switch 254 is connected in series with a relay 256 between power lines $L_1$ and $L_2$. Contacts 254-1 and 254-2 work in alternation such that when contact 254-1 closes its circuit, contact 254-2 opens its circuit and vice versa. Switch 254 may be considered a mode control switch which allows operation in a "stacking" or "booking" mode when contact 254-2 is closed and operation in a reclaim-reject mode when contact 254-1 is closed.

Contact 254-2, in addition to being in series with relay 256 is also in series, between lines $L_1$ and $L_2$, with motor controller 146 through normally open contacts 258-1 and limit switch contacts 250-1, in parallel with one another. Paralleled contacts 258-1 and 250-1 are connected intermediate contact 254-2 and controller 146 in series therewith. Contacts 250-1 and 258-1 are connected at one end to contact 254-2 and intermediate controller 146 and contact 254-1 at the other end. Relay 256 is connected with contact 254-2 at a point electrically in common with the latter's connection to paralleled contacts 250-1 and 258-1. Contacts 250-1 is one of two ganged contacts of limit switch 250, the other contact 250-2 working in alternation therewith such that only one of the two is closed at once. Preferably they both are open for an instant during actuation to prevent unwanted sneak circuits. Contact 250-1 is normally closed and is actuated open by a member contacting limit switch 250. Limit switch 250 remains so actuated as long as the member is in contact therewith.

As shown in FIG. 8, the other contact, 250-2, of limit switch 250 is connected in series with timing relay 260 and normally open relay contact 256-1 between lines $L_1$ and $L_2$. A timing relay 258 is connected between lines $L_1$ and $L_2$ through a circuit including, in series, switch 252, normally open relay contact 260-1 and normally open relay contact 256-2. Limit switch 252 is normally open and is actuated closed only while a member is in contact therewith.

A circuit for controlling energization of solenoid 145 is connected in series therewith across lines $L_1$ and $L_2$ and is shown in FIG. 8 as comprising normally open relay contacts 256-3 and 260-2 in series and connected in parallel across switch 224.

A circuit for controlling energization of solenoid 144 is connected in series therewith across lines $L_1$ and $L_2$ and is shown in FIG. 8 as comprising serially connected normally open relay contacts 258-2 and 256-4 in parallel connection with earlier mentioned serially connected relay contact 214-1 and switch 230.

Each timing relay 258 and 260 is a well known type which may delay actuation of associated contacts for a predetermined period following energization of the relay and then maintains the contact in its actuated state for a predetermined adjustable period thereafter. Further, one contact of such a relay may have a different delay and period of actuation than another contact of the same relay. In the present embodiment, contact 260-2 closes essentially immediately upon energization of relay 260 and remains closed just long enough for conveyor 32 to pivot downward to a predetermined position intermediate the first or raised limit position and the second or lowered limit position. Preferably this intermediate position, seen in FIG. 2 and FIGS. 9b and 9c, is such that the upper surface of belts 138 at the upstream end of conveyor 32 are below the level of main path 12 an amount greater than the thickness of a single sheet of wallboard. In this instance, contact 260-1 remains closed several seconds, possibly 6. Contact 260-1 closes and opens simultaneously with the energization and de-energization respectively of relay 260.

Contacts 258-1 and 258-2 both close at about the same time in this embodiment, the closing time being delayed several seconds following energization of relay 258 to allow a sheet of wallboard to pass the location of limit switch 252 and completely overlay a sheet resting on the downwardly pivoted conveyor 32. When contacts 258-1 and 258-2 are closed, they respectively remain so long enough to start belts 134 to move the booked sheets of wallboard beyond limit switch 250 and to return conveyor to its raised position in the main path 12. This "closed" period may be the same for both or may differ. Also the time of closing for both may be the same, as stated, or they might be staggered somewhat if desired.

Referring now to the transport system and particularly conveyor 32, the boking operations will be described with reference to FIGS. 9a–e. It will be appreciated that the need to book two or more sheets without inverting any of them will require that booker 20 of FIG. 1 be removed from operation. This may be done by physically removing the booker 20, or preferably, making to it inoperative for booking but allowing it to remain in position and serve as a simple conveyor. It will also be appreciated that the reject-reclaim operational mode previously described and the novel booking operation to be described are essentially mutually exclusive and comprise separate mutually exclusive modes of operation.

Figure 9A:
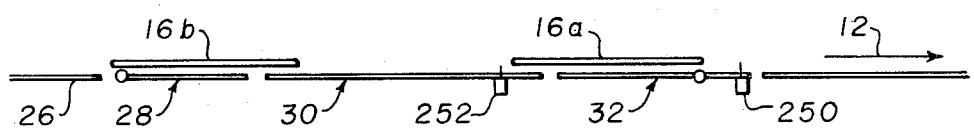
FIGS. 9a–e are diagrammatical side views of the system, similar to FIG. 2, showing the downstream pivoting conveyor as used for booking an adjacent pair of wallboard sheets.
Figure 9B:
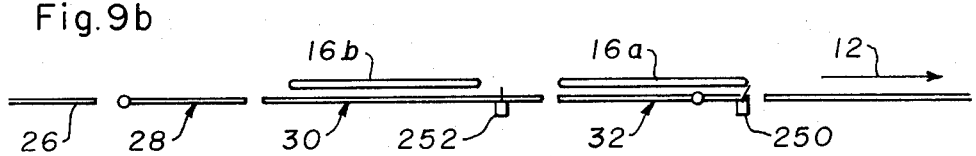
Figure 9C:
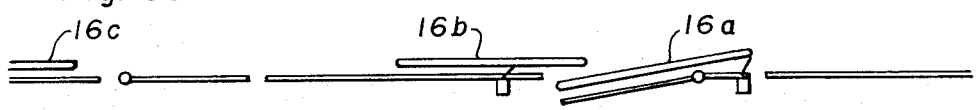

The conveyors diagrammatically illustrated in FIGS. 9a–e are numbered to correspond with the equivalent apparatus of the earlier figures. Switch 254 of FIG. 7 is actuated to open contact 254-1 and close contact 254-2, transferring the controls from a reject-reclaim mode to a booking mode. In this latter mode energization of motor controller 146, which drives belts 134 on conveyor 32, depends on either limit switch contacts 250-1 or relay contact 258-1 being closed. Normally, limit switch contact 250-1 will be closed when not actuated, as seen in FIG. 9a, and all of the conveyors including 32 serve to convey wallboard sheets 16a, 16b, etc., along the main path 12.

When the first sheet 16a of a series of sheets contacts and actuates limit switch 250, as seen in FIG. 9b, contact 250-1 is opened, breaking the circuit to motor controller 146 and stopping the sheet 300a on conveyor 32. The positioning and operation of limit switch 250 is such that the trailing end of sheet 300a is clear of the downstream end of conveyor 30 when conveyor 32 stops.

As contact 250-1 of the limit switch is being opened, contact 250-2 thereof is actuated closed. Relay 256 will be energized throughout the booking mode thus maintaining contact 256-1 closed. Therefore, when contact 250-2 closes, timing relay 260 will be energized. Timing relay 260 controls actuation of contact 260-2 in series with now closed contact 256-3 and solenoid 145. Contact 260-2 may close immediately upon or shortly after energization of its relay 260 and is maintained closed a predetermined adjustable period of time by the associated timing means. This period of time is that required for conveyor 32 to pivot downward from the raised limit position to the intermediate or booking position seen in FIG. 9c. This capability is provided by the nature of piston and cylinder 142 and the operation thereof, as controlled by solenoids 144 and 145. When neither solenoid is energized, the piston of 142 remains at its last positioning immediately prior to de-energization of the solenoid. As solenoid 145 controls downward movement, its period of energization is thus controlled.

The intermediate or booking position is selected such that the sheet 16b immediately following sheet 16a may slide over the top of sheet 16a, propelled from upstream by conveyor 30. The incline of conveyor 32 must not be so great as to allow sheets 16a and 16b to slide downward and off. Typically, the upstream end of conveyor 32 will be below the main path 12 and upper surface of conveyor 30 by an amount somewhat greater than the thickness of sheet 16a such that sheet 16b initially freely clears the upstream end of sheet 16a and initially contacts it downstream thereof.

Figure 9D:
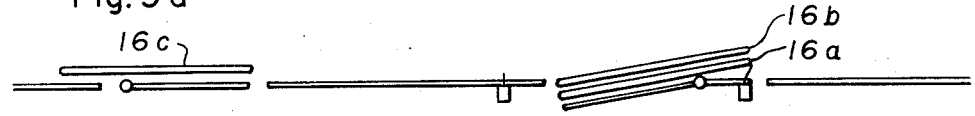

The controls are such that the belts of conveyor 32 were stopped when the upstream end of sheet 16a just clears conveyor 30 and conveyor 30 propels sheet 16b onto sheet 16a into relatively closely aligned stacked relationship therewith, as seen in FIG. 9d.

When sheet 16b contacts limit switch 252, as in FIG. 9c, it is actuated closed. Contact 256-2 is closed for the entire mode and contact 260-1 is timed to close and open in unison with the energization and de-energization, respectively, of relay 260 which is presently energized because limit switch contact 250-2 is being held closed. Thus, timing relay 258 becomes energized with the closing of limit switch 252 and remains so until the limit switch reopens.

When timing relay 258 is energized, it effects the timed closing and opening of contacts 258-1 and 258-2. A delay of several seconds occurs between the energization of relay 258 and the closing of either of the associated contacts. This delay is of sufficient length to allow sheet 300b to move from the point at which it actuated limit switch 252 to the stacked position on sheet 16a shown in FIG. 9d. Following the delay, the contacts 258-1 and 258-2 are closed, in this instance in unison though not of necessity. With contact 256-4 and now contact 258-2, closed, solenoid 144 is energized. Solenoid 144 raises conveyor 32 to its raised limit position and contact 258-2 remains closed sufficiently long to complete this operation.

Figure 9E:
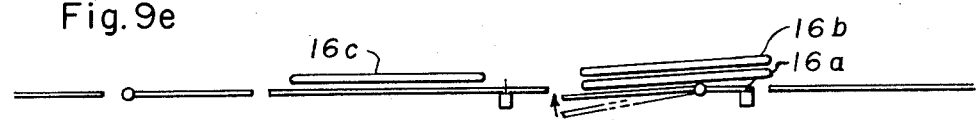

Contacts 258-1, also delayed in closing, now provides a closed circuit between motor controller 146 and closed mode control switch contact 254-2 to restart motor 146 and belts 138. FIG. 9e depicts the apparatus a short time, possibly a second or two, following initiation of upward pivoting of conveyor 32 and restarting the belts thereon. Contact 258-1 remains closed long enough to allow the upstream end of the now booked sheets 16a and 16b to clear limit switch 250 and allow its contact 250-1 to reclose a circuit to motor controller 146. The booked sheets continue downstream of conveyor 32 and are generally stored. Further processing might follow storage and include addition of a covering to the smooth upper surface of each sheet, requiring only that the sheets be "unbooked" without the need for inverting one of them.

The next sheet 16c, following sheet 16b will, in this embodiment, comprise the first sheet of the next pair to be booked. It will be appreciated that conveyor 32 might have been pivoted downward further and a counter might be associated with limit switch 252 in order to allow a third, or fourth, or possibly more, sheets to be added to the book. The counter would maintain motor controller 146 de-energized for a specific number of additional sheets.

The non-inverting booking apparatus described herein is particularly suited for integration with the reclaim-reject apparatus to form a part thereof, however it will be appreciated that the embodiment shown and described herein is merely illustrative and that changes may be made without departing from the scope of the invention as claimed.

What is claimed is:

1. In a device of the character described for moving sheet-like members along a main transport path, means for transferring various of said sheet-like members between a position along said main transport path intermediate the ends thereof and an accumulation region offset from said main transport path comprising:
   a. first conveyor means at least partially in a transfer region spaced below and under said main transport path and extending between said transfer region under said main transport path and said accumulation region for transporting said various sheet-like members therebetween; and
   b. second conveyor means normally disposed to transport said sheet-like members along part of said main transport path intermediate the ends thereof and selectively actuable to an orientation extending from said main transport path to member transferring registration with and adjacent said first conveyor means at said transfer region for supportingly transport said various members between said first conveyor means and said main transport path.

2. The apparatus of claim 1 wherein said second conveyor means comprise:
   a. a table including power driven means thereon for supportingly moving said sheet-like members relative to said table;
   b. means supporting said table for pivotal motion between first and second positions about a horizontal axis extending transversely of the main transport path, said member moving means transporting said members along said main transport path in said first position and transporting said various members along an inclined path between said transfer region and main transport path in said second position; and
   c. means for selectively actuating said table supporting means between said table first and second positions.

3. The apparatus of claim 2 wherein said main transport path is unidirectional and said table of said second conveyor means has member receiving and member discharging ends, said axis about which said table pivots is near said receiving end, said receiving end is upstream of said discharge end relative to the travel direction of said main transport path and said table is normally in said first position and is actuable to said second position to reject said various sheet-like members from said main transport path.

4. The apparatus of claim 2 wherein said main transport path is unidirectional and said table of said second conveyor means has member receiving and member discharging ends, said axis about which said table pivots is near said discharge end, said discharge end being downstream of said receiving end relative to the travel direction of said main transport path and said table is normally in said first position and is actuable to said second position to reclaim said various sheet-like members transported from said accumulation region for transport to said main transport path.

5. The apparatus of claim 3 wherein said first conveyor means include first and second tables each having a power driven movable support surface associated therewith for movably supporting a said member thereon, said first table support surface located in said transfer region and having a member receiving end juxtaposed with the discharging end of said second conveyor means table in its said second position and said support surface movable in substantially the same direction as said main transport path; said second table support surface having a member receiving end in said transfer region and a discharge end communicating with said accumulation region, said second table support surface near said receiving end thereof being coextensive with a portion of said first table support surface laterally thereof and said second table support surface is movable toward said accumulation region in a direction different than that of said main transport path; and means for controlling the elevations of said first and second table support surfaces relative to one another in said region of coextensivity in timed relationship to the passage of a said various board member therealong, whereby at least part of said first table support surface is initially uppermost thereat to supportingly receive a said member from said second conveyor means and at least part of said second table support surface is subsequently uppermost thereat to supportingly receive said member from said first table support means for transport to said accumulation region.

6. The apparatus of claim 4 wherein said first conveyor means includes first and second tables each having a support surface associated therewith for movably supporting a said member thereon, said first table support surface located in said transfer region and having a member discharging end juxtaposed with the receiving end of said second conveyor means table in its said second position and said support surface movable in substantially the same direction as said main transport path; said second table support surface having a member discharging end in said transfer region and a receiving end communicating with said accumulation region, said second table support surface near said discharging end thereof being coextensive with said first table support surface laterally thereof and said second table support surface is movable toward said transfer region from said accumulation region in a direction different than that of said main transport path; and means for controlling the elevations of said first and second table support surfaces relative to one another in said region of coextensivity in timed relationship to the passage of a said various board member therealong, whereby said second table support surface is initially uppermost thereat to supportingly receive a board member from said accumulation region and said first table support surface is subsequently uppermost to supportingly receive said board member from said second table support means for transport to said second conveyor means.

7. The apparatus of claim 5 wherein said first conveyor means first and second table support surfaces each comprise a plurality of parallel, spaced-apart elements for movably supporting said various sheet-like members, said second table member supporting elements are interdigitally arranged with said first table member supporting elements in said region of lateral coextensivity to permit vertical reciprocable movement therebetween, said first table member supporting elements imparting motion to a member in a direction 90° to that of the motion imparted by said second table member supporting elements.

8. The apparatus of claim 6 wherein said first conveyor means first and second table support surfaces each comprise a plurality of parallel, spaced-apart elements for movably supporting said various sheet-like members, said second table member supporting elements are interdigitally arranged with said first table member supporting elements in said region of said lateral coextensivity to permit vertical reciprocable movement therebetween, said first table member supporting elements imparting motion to a member in a direction 90° to that of the motion imparted by said second table member supporting elements.

9. The apparatus of claim 8 additionally including stop means positioned near the member discharging end of said second table support surface for stopping a said member thereon at the region of said coextensivity between said first and said second tables.

10. The apparatus of claim 1 wherein said first conveyor means include first and second tables each having a power driven movable support surface associated therewith for supporting a said member thereon, said first table support surface being located in said transfer region and having an end positioned to receive a said member from said second conveyor means actuated to its said member transferring registration therewith and said support surface is movable in substantially the same direction as said main transport path; said second table support surface having one end in said transfer region and the other end communicating with said accumulation region, said second table support surface near said one end thereof being coextensive with a portion of said first table support surface and said second table support surface is movable between said transfer region and said accumulation region in a direction different than that of said main transport path; and means controlling the elevations of said first and second table support surfaces relative to one another in said region of lateral coextensivity in response to the passage of said various members therealong, for initially positioning one of said first and second table support surfaces uppermost to supportingly receive and transport a said member thereon and subsequently positioning the other uppermost to supportingly receive said member from said initially uppermost one.

11. The apparatus of claim 1 wherein said main transport path is unidirectional and said second conveyor means comprise first and second tables, each said table including power driven means thereon for supportingly moving said sheet-like members relative to said table from a receiving end to a discharging end thereof; first and second means respectively supporting said first and second tables for pivotal motion between first and second positions about respective horizontal axes extending transversely of the main transport path, said axis about which said first table pivots being near said receiving end thereof, said axis about which said second table pivots being near said discharging end thereof, said first table axis being generally upstream of and said second table axis being generally downstream of said first conveyor means relative to the travel direction of said main transport path, said member moving means of each said table transporting said members along said main transfer path in said table first position and transporting said various members along an inclined path between said transfer region and main transfer path in said table second position, each said table normally being in its said first position; and control means for actuating each of said first and second table supporting means between said first and second table positions, said first table being actuated to its said second position to reject said various sheet-like members from said main transport path and said second table being actuated to its said second position to return said various sheet-like members to said main transport path.

12. The apparatus of claim 11 wherein said means pivotably supporting said second conveyor table is additionally actuable to a position intermediate said first and second positions and said control means are alternatively operative in an automatic reclaim-reject mode and an automatic stacking mode and include circuit means operative in said stacking mode for stopping the member moving means of said second conveyor table and for actuating said second table supporting means to said intermediate position when a first member is on said second table and for restarting said moving means and actuating said second table supporting means to said first position each in timed relation to the next member after said first being at a particular location along said main transport path.

13. The apparatus of claim 11 wherein said second table pivot control means include switch means for actuating said table to its said second position in response to the presence of a member at a particular position along said main transfer path.

14. The apparatus of claim 11 wherein said first conveyor means include third and fourth tables each having a power driven movable support surface comprising a plurality of parallel spaced-apart movable elements and means for driving said elements for supportingly moving said various sheet-like members thereon, said fourth table elements and driving means therefor being reversible, said third table support surface being located in said transfer region and having one end juxtaposed with the discharging end of said first table actuated to its said second position and the other end juxtaposed with the receiving end of said second table actuated to its said second position and said support surface is movable in substantially the same direction as said main transport path; said fourth table support surface having one end in said transfer region and the other end communicating with said accumulation region, said fourth table support surface near said one end thereof being coextensive with a portion of said third table support surface laterally thereof and said fourth table support surface being reversibly driven in a direction substantially perpendicular to that of said third table support surface, said fourth table member supporting elements being interdigitally arrranged with said third table member supporting elements in said region of laterally coextensivity; means supporting said third and fourth tables for generally vertical movement relative to one another in said region of lateral coextensivity between a first orientation in which the support surface of one table thereat is above that of the other and a second orientation in which the support surface of said other table is above that of said first; and control means for vertically actuating at least one of said third and fourth table supporting means, whereby initially one of said third and fourth table support surfaces is uppermost to supportingly receive and transport a said member thereon and subsequently the other is uppermost to supportingly receive said member at said region of coextensivity from said one uppermost initially.

15. The apparatus of claim 14 including control means incorporating said first and second table pivotal control means and said third and fourth table vertical orientation control means and adapted for operation alternatively in a normal mode, a reject mode and a reclaim mode for moving said members only along said main transfer path in said normal mode; for actuating said first table to its second second position when a said member is at a particular position in said transport path upstream of the discharge end of said first table, driving said fourth table support surface toward said accumulation region, and actuating said fourth table at said region of coextensivity from an initial position below that of said third table to said uppermost position when a said member is thereat on said third table in said reject mode; and for driving said fourth table support surface toward said transfer region, initially elevating said fourth table support surface at said region of coextensivity to said uppermost position and subsequently lowering said fourth table support surface to provide said third table support surface as said uppermost when a said member is at said region on said fourth table, and actuating said second table to its said second position when a said member is at a particular position on said third table in said reclaim mode, the said mode of operation being controlled by switch means.

16. The apparatus of claim 14 including control means for said fourth table element driving means including means for controlling operation in a reject and a reclaim mode, said drive means moving said elements to propel a said member toward said accumulation region in said reject mode and toward said transfer region in said reclaim mode; and wherein said means for controlling pivotal motion of said first table includes means for controlling operation in a normal and a reject mode and means operative in said reject mode for actuating said first table to its said second position when a said member is at a particular location along said main support path upstream of the discharge end of said first table; said means for controlling pivotal motion of said second table include means for controlling operation in a normal and a reclaim mode and means operative in said reclaim mode for actuating said second table to its said second position when a said member is at a particular location on said third table; said third table is supported in a vertically stationary position; said fourth table is elevated from a support surface position normally below that of said third table to one thereabove; and said means controlling the actuation of said at least one of said third and fourth table supporting means include means for controlling operation in a reject and a reclaim mode and means operative in said reject mode for actuating the fourth table supporting means upward to said position in which said fourth table support surface is uppermost while a said member is at said region of coextensivity and operative in said reclaim mode for initially actuating the fourth table supporting means upward to said position in which said fourth table support surface is uppermost and for subsequently returning said support surface to its said normal lower position only when a said member is at said region of coextensivity.

17. The apparatus of claim 5 wherein the lateral dimension of a said member relative to its direction of travel on said first table may be substantially less than the lateral dimension of said table and said second table comprises in said region of coextensivity two subtables each having said movable elements forming said support surface, one said subtable being more remote from said accumulation region than the other and being at least as long as said lateral dimension of said member and being substantially in vertical registry with that portion of said first table receiving a said various member from said second conveyor means table, said subtables being controllably supported for vertical movement relative to one another to position the support surface of said one subtable above that of said first table only while a said member is located thereabove.

18. The apparatus of claim 14 wherein a said member occupies a predetermined lateral positioning along said main transport path, said first table and said third table and the lateral dimension of a said member relative to its direction of travel on said third table may be substantially less than the lateral dimension of said table and said fourth table comprises in said region of coextensivity two subtables each having said movable elements forming said support surface, one said subtable being more remote from said accumulation region than the other and being at least as long as said lateral dimension of said member and being substantially vertically aligned with a portion of said third table laterally aligned with said predetermined lateral positioning of said members, said means supporting said fourth table include means supporting each of said subtables independently of the other for relative vertical motion therebetween and said control means for actuating at least one of said third and fourth table supporting means include means for actuating each of said subtables supporting means independently of the other.

19. The apparatus of claim 16 wherein the lateral dimension of a said member relative to its direction of travel on said third table may be wider or narrower than a predetermined dimension and that portion of each said member on said first table most remote from said accumulation region occupies a substantially constant predetermined lateral positioning thereon and said fourth table comprises in said region of coextensivity two subtables each having said movable elements forming said support surface, one said subtable being more remote from said accumulation region than the other and being at least as long as said predetermined dimension and being substantially in vertical registry with a portion of said third table laterally aligned with said predetermined lateral positioning and said remote portion of each said member, said means supporting said fourth table include means supporting each of said subtables independently of the other for relative vertical motion therebetween and said means controlling actuation of said fourth table support means additionally include means for individually controlling actuation of each of said subtable support means and means for controlling actuation of said subtables in said reject mode alternatively in a wide member mode and a narrow member mode, both said subtable support means being actuated to said uppermost position while a said member is over said one table in both said wide and said narrow member reject modes and each said subtable returning to its normal position as a said member is no longer supported thereon in said narrow member reject mode and both said subtables together returning to said normal positions when a member is no longer supported on either on thereof in said wide member reject mode.

20. The apparatus of claim 16 wherein said third table comprises two subtables each having said movable elements forming said support surface, one said subtable being in said region of coextensivity and having an end juxtaposed with the discharging end of said first table actuated to its said second position and the other said subtable having a receiving end juxtaposed with the other end of said one subtable and having a discharge end juxtaposed with the receiving end of said second table actuated to its said second position, said means for driving said third table movable elements include means for driving the elements of one said subtable independently of the other and means for controlling operation of both said subtable element driving means in a reject and a reclaim mode, said elements of said one subtable being driven continuously in either of said modes and said elements of said other subtable being driven in either of said modes except when a said member is near the discharge end of said other subtable and said second table is in its first position.

21. In a transport system for moving sheet-like members along a main transport path, apparatus for stacking a pair of serially adjacent members moving therealong comprising: a first power driven conveyor; a second conveyor downstream of said first for receiving members therefrom and being pivotably mounted for rotation about a horizontal axis near its downstream end; means for controllably driving said second conveyor; means for pivoting said second conveyor between a first position aligned with said first conveyor and a second position downwardly inclined from said first position; and a control assembly for automatically stopping said second conveyor driving means when the first member of said pair is on said second conveyor, for lowering said second conveyor to said second position in timed relationship to said stopping of said driving means, and for raising said second conveyor to said first position and restarting said second conveyor driving means each in timed response to the second member of said pair being at a particular position along said first conveyor.

22. The apparatus of claim 21 wherein said control assembly includes circuit means for restarting said second conveyor driving means and raising said second conveyor substantially in unison.

23. In a device of the type described for normally moving sheet-like members along a main transport path toward an end thereof, the method of rejecting various of said members from said transport path at a location upstream of said end and transporting said members so rejected to an accumulation region spaced laterally of said path comprising the steps of: supportingly conveying said various members to be rejected from said transport path in a direction substantially aligned therewith to a transfer position spaced therebelow; and conveying said members from said transfer position to said accumulation region.

24. In a device of the type described for normally moving sheet-like members along a main transport path between ends thereof and having an accumulation region offset from said path, the method of introducing various of said members to said transport path intermediate the ends thereof from said accumulation region comprising the steps of conveying said various members from said accumulation region to a transfer region spaced below said transport path; and supportingly conveying said various members from said transfer region to said transport path intermediate the ends thereof in a direction substantially aligned with said transport path thereat.

25. In a device of the type described for normally moving sheet-like members along a main transport path including a controllably driven conveyor controllably pivotable about its downstream end, the method of stacking a pair of serially adjacent members on one another comprising: conveying the first member of said pair onto said conveyor; stopping said conveyor when said first member is thereon; pivoting the upstream end of said conveyor downward from said main transport path a particular distance to receive said second member thereon over said first member; conveying said second member of said pair onto said first member; pivoting said conveyor upward to said main transport path when said second member is thereon; and conveying said pair of members from said pivotable conveyor.

26. The method of claim 25 wherein said particular distance which said conveyor is pivoted below said main transport path is slightly greater than the vertical thickness of said first member.

27. The method of claim 25 wherein said step of conveying said pair of members from said pivotable conveyor comprises restarting said conveyor.

28. In a device of the character described for moving sheet-like members along a main transport path, means for transferring various of said sheet-like members between a position along said main transport path intermediate the ends thereof and an accumulation region offset from said main transport path comprising:
   a. first conveyor means at least partially in a transfer region spaced below said main transport path and extending between said transfer region and said accumulation region for transporting said various sheet-like members therebetween; and
   b. second conveyor means normally disposed to transport said sheet-like members along part of said main transport path intermediate the ends thereof and selectively actuable to an orientation extending from said main transport path to member transferring registration with and adjacent said first conveyor means at said transfer region for supportingly transporting said various members between said first conveyor means and said main transport path comprising:
   i. a table including power driven means thereon for supportingly moving said sheet-like members relative to said table,
   ii. means supporting said table for pivotal motion between first and second positions about a horizontal axis extending perpendicularly of the main transport path thereat, said member moving means transporting said members along said main transport path in said first position and transporting said various members along an inclined path between said transfer region and main transport path in said second position, and
   iii. means for selectively actuating said table supporting means between said table first and second positions.

* * * * *